United States Patent
Zhao et al.

(10) Patent No.: US 9,479,412 B2
(45) Date of Patent: Oct. 25, 2016

(54) SYSTEMS AND METHODS FOR IMPROVED QUALITY OF A VISUALIZED CALL OVER NETWORK THROUGH PATHWAY TESTING

(71) Applicants: Bin Zhao, Shanghai (CN); Wei Li, Shanghai (CN)

(72) Inventors: Bin Zhao, Shanghai (CN); Wei Li, Shanghai (CN)

(73) Assignee: Agora Lab, Inc., Palo Alto, CA (US)

( * ) Notice: Subject to any disclaimer, the term of this patent is extended or adjusted under 35 U.S.C. 154(b) by 60 days.

(21) Appl. No.: 14/500,960

(22) Filed: Sep. 29, 2014

(65) Prior Publication Data

US 2015/0381450 A1   Dec. 31, 2015

Related U.S. Application Data

(60) Provisional application No. 62/018,520, filed on Jun. 27, 2014, provisional application No. 62/018,522, filed on Jun. 27, 2014.

(51) Int. Cl.
| | |
|---|---|
| H04L 12/26 | (2006.01) |
| H04M 3/22 | (2006.01) |
| H04L 12/841 | (2013.01) |
| H04M 1/253 | (2006.01) |
| H04L 12/24 | (2006.01) |
| H04M 1/725 | (2006.01) |

(52) U.S. Cl.
CPC ....... *H04L 43/0864* (2013.01); *H04L 41/5038* (2013.01); *H04L 43/062* (2013.01); *H04M 3/2236* (2013.01); *H04L 47/283* (2013.01); *H04M 1/2535* (2013.01); *H04M 1/72547* (2013.01); *H04M 2250/62* (2013.01); *H04M 2250/74* (2013.01)

(58) Field of Classification Search
CPC ..................... H04L 41/5038; H04M 1/72547; H04M 2250/62; H04M 2250/74
See application file for complete search history.

(56) References Cited

U.S. PATENT DOCUMENTS

| | | | | |
|---|---|---|---|---|
| 2002/0131604 A1* | 9/2002 | Amine | ................. | H04R 29/004 381/58 |
| 2005/0261860 A1* | 11/2005 | Lobig | ................. | H04L 12/2697 702/122 |
| 2011/0205915 A1* | 8/2011 | Skrabutenas | ......... | H04M 3/002 370/252 |
| 2011/0235541 A1* | 9/2011 | Choudhury | ............. | H04L 65/80 370/252 |
| 2014/0044246 A1* | 2/2014 | Klemm | ................. | H04M 3/523 379/93.01 |

* cited by examiner

*Primary Examiner* — Harry S Hong
(74) *Attorney, Agent, or Firm* — Kang S. Lim

(57) ABSTRACT

Systems and methods for improving quality of a call over network (CON) are provided. Call quality may be improved via pathway testing to determine data path quality. This may be utilized to inform buffering lengths, and also may be utilized to choose the data pathway utilized for transmitting the data. Pathway testing may employ collecting microphone data on one device, transmitting it across the various pathways, and then comparing the quality at the endpoint compared to the initial data.

18 Claims, 24 Drawing Sheets

SYSTEMS AND METHODS FOR IMPROVED QUALITY OF A VISUALIZED CALL OVER NETWORK THROUGH PATHWAY TESTING

CROSS REFERENCE TO RELATED APPLICATIONS

This application claims the benefit of and is a continuation-in-part of U.S. provisional application No. 62/018,520 filed Jun. 27, 2014 by Bin Zhao et al. entitled "Systems and Methods for Visualizing a Call Over Network", which application is incorporated in its entirety by this reference.

This application also claims the benefit of and is a continuation-in-part of U.S. provisional application No. 62/018,522 filed Jun. 27, 2014 by Bin Zhao et al. entitled "Systems and Methods for Improved Quality of a Visualized Call Over Network", which is incorporated herein in its entirety by this reference.

Further, this application is related to co-pending U.S. application Ser. No. 14/500,954, filed Sep. 29, 2014, entitled "Systems and Methods for Visualizing a Call Over Network", by Bin Zhao et al., which is incorporated herein in its entirety by this reference.

Additionally, this application is related to co-pending U.S. application Ser. No. 14/500,968, filed Sep. 29, 2014, entitled "Systems and Methods for Visualizing a Call Over Network with a Caller Readiness Dialog Box", by Bin Zhao et al., which is incorporated herein in its entirety by this reference.

Additionally, this application is related to co-pending U.S. application Ser. No. 14/500,984, filed Sep. 29, 2014, entitled "Systems and Methods for a Call Over Network with a Visualized Summary", by Bin Zhao et al., which is incorporated herein in its entirety by this reference.

Lastly, this application is related to co-pending U.S. application Ser. No. 14/500,998, filed Sep. 29, 2014, entitled "Systems and Methods for Improved Quality of a Visualized Call Over Network Through Scenario Based Buffer Modulation", by Bin Zhao et al., which is incorporated herein in its entirety by this reference.

BACKGROUND

This invention relates generally to systems and methods improving the quality of a call over network. Such systems and methods enable more efficient communications over networks than is currently available due to better communication fidelity. This results in faster and more productive calls. In addition, such call quality improvements may be particularly useful when employed in conjunction with call visualization systems and methods.

Currently, a number of platforms are available for call over network (CON) communications. These typically include audio and/or video calling capabilities that rely upon the internet (or other suitable network) in order to enable communications between two or more participants. Examples of current CON systems include Vonage, Skype, WebEx, and Facetime, for example. Each of these systems have some differentiating features, but predominantly operate via scheduling or otherwise initiating a call, and then transmitting and receiving audio and/or video material. In some of the more sophisticated CON systems, such as WebEx, participants additionally have the capability to share their computer desktop, and further, pass this functionality to other participants.

While these CON systems have done a lot to enhance causal communications, the larger impact of CON systems is arguably on in relation to how businesses operate. Traditionally, in-face meetings were required to fully engage other business partners. The conference call was available, but often didn't provide sufficient context to be an efficient form of communication. These newer CON systems have further increased how easily remote participants can communicate effectively; however, there are still a number of problems that tend to plague existing CON systems.

For example, proper connectivity of all users in a CON system is routinely an issue. Often one participant can have trouble joining or hearing without the other participant's knowledge. Connectivity issues are also often sources of inefficiencies for call over network communications. Indeed, one of the largest problems facing CON systems is the fact that data is typically transmitted via the internet, which is a "best effort network". Best effort network means that the data is transmitted with the best timing and quality reasonably possible. However, the data is transmitted over often torturous pathways, in sub-optimal conditions. As such, often timing and/or quality of the transmitted data are negatively impacted.

Traditional call over network systems handle this reduction in call quality and/or timing by reducing high data demanding communications. For example, in Skype, the video portion of the call may have a reduced quality, or may be halted altogether. Additionally, these existing systems simply drop the call if the timing and/or quality gets below a threshold. The thinking behind these dropped calls is that the inconvenience of not being able to communicate is less burdensome that a bad connection.

While there is some merit to this business model, there are some circumstances where communication is required, even in sub-optimal network conditions. This can be especially true where a number of participants are engaging in a conference call. Here schedules are often difficult to coordinate, and as such the need to communicate via that medium, and at that time, are magnified.

All of these drawbacks to existing CON systems requires that callers repeat information more often, and reduces efficiency for all members. Moreover, in the extreme situation of a badly compromised network connection, existing CON systems are rendered inoperable. Impatient participants that have a good connection may quickly lose interest in the conversation as the pace seems unbearably slow, or as the calls are dropped. Other participants may leave the call missing much of what has been communicated. Often these participants don't want to ask for clarification too often due to respect for the numerous other participants' time. In the case of dropped calls, important communication may simply never happen.

It is therefore apparent that an urgent need exists for systems and methods for improving the quality of a call over network. Such systems and methods may be particularly helpful when coupled to call visualization which provides tools and interfaces that increase participant understanding, and thereby enhances efficiency of these communications. Such systems and methods provide variable buffering of call data in such a manner as to enable high call fidelity without burdening the users with distracting latencies. Further embodiments also enable means for diagnostic capability of the audio pathway.

SUMMARY

To achieve the foregoing and in accordance with the present invention, systems and methods for improving quality of a call over a network is provided. Such systems and methods enable enhanced call conferencing capabilities which eliminate or reduce a number of the problems that currently plague traditional call conferencing platforms. This results in better understanding among the various participants of the call. Such systems and methods may be particularly beneficial when utilized in conjunction with call visualization.

In some embodiments, call quality may be improved via pathway testing to determine data path quality. This may be utilized to inform buffering lengths, and also may be utilized to choose the data pathway utilized for transmitting the data.

In some of these embodiments, at least two data pathways may be tested for quality, and the buffer length may be modulated in response to the best pathway's quality. Longer buffers may be employed for poorer quality pathways, or may be shortened if the pathways are more optimal.

Pathway testing may employ collecting microphone data on one device, transmitting it across the various pathways, and then comparing the quality at the endpoint compared to the initial data. Additional steps of generating the sound by a speaker that is collected by the microphone in the first place, playing the data at the end location via a speaker, collecting the played data at the end location via a microphone, and even returning the data via the pathways, in some embodiments.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

Figure 1:
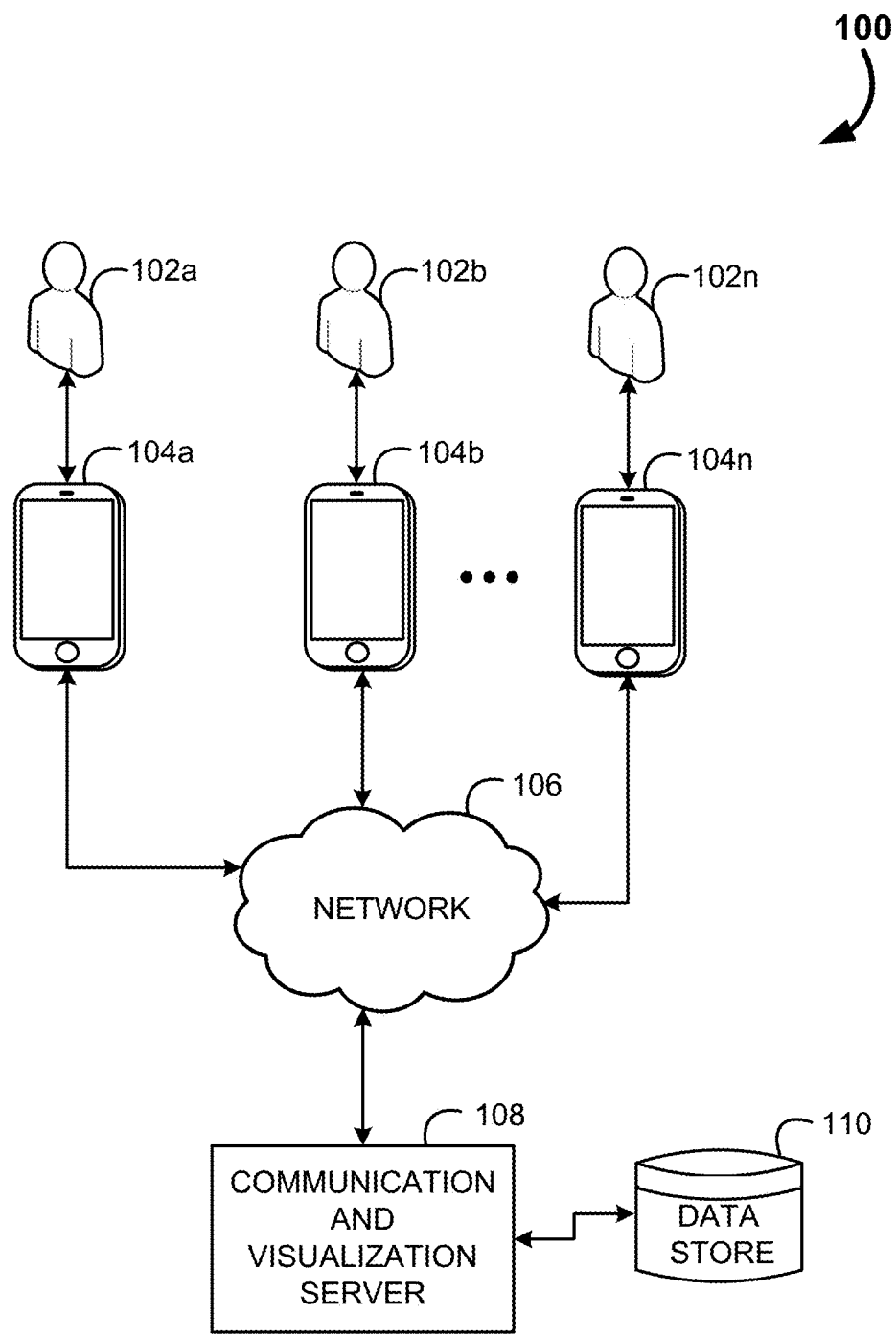
FIG. 1 is an example schematic block diagram for a system for a call over network, in accordance with some embodiments.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after,"

"lastly," and "finally," are not meant to limit the scope of the present invention as the embodiments disclosed herein are merely exemplary.

The following discussion relates to methods and systems for improving quality of a call over network (CON). In particular, such quality enhancements may be employed most effectively when in conjunction with the visualization of the call over network. Such systems and methods enable enhanced call conferencing capabilities which eliminate or reduce a number of the problems that currently plague traditional call conferencing platforms. This results in higher call fidelity, which directly translates into better understanding among the various participants of the call.

As previously noted, a number of current CON systems are available. Each of these systems has some benefits compared against one another, but all of them fail to provide the improved call quality features disclosed herein. For the sake of clarity, the presently disclosed call quality functions will be described as an integrated CON standalone system. However, despite this portrayal of the CON system with these quality features, it is also considered within the scope of this disclosure that the functionalities disclosed herein could in incorporated into an add-on module, capable of overlaying existing CON architectures. In such a way, callers could continue to rely upon Skype, for example, due to brand loyalty and robust back end servers, and yet still enjoy the added quality enhancements disclosed herein. As such, an overlay application for an existing CON system, or a fully integrated CON system are considered equally covered by the present disclosure.

The term "device" as used herein is intended to refer to any device to which a participant may communicate with via the CON. Often these devices are also referred to as "mobile devices" as one focus of such communication is with devices such as laptops, cell phones, and tablets. However, it should be understood that any device where communication is desired falls within the scope of the term "device".

Also note that the term "participant" is utilized to describe the user of a device who is engaging in a call. It is likewise understood that the terms "user", "caller", and "member" are likewise often utilized interchangeably with the term "participant".

Moreover, while the term "call" is utilized, and often referred to in relation to audio communication, the term "call" is intended to be broad enough to encompass any audio and/or video communication. Thus, for the sake of clarity, many of the examples will center on audio only conference type calling, but video calls, or calls whereby digital material or desktop screenshots are shared, are equally intended to be within the scope of the term "call".

Note that the following disclosure includes a series of subsections. These subsections are not intended to limit the scope of the disclosure in any way, and are merely for the sake of clarity and ease of reading. As such, disclosure in one section may be equally applied to processes or descriptions of another section if and where applicable.

I. Quality Enhancement of a Call Over Network

To facilitate this discussion, FIG. 1 provides an example schematic block diagram for a system for a call over network, shown generally at 100. In this example block diagram, a number of participants 102a-n are illustrated engaging a plurality of devices 104a-n. Note that for a successful call only two devices, and a minimum of two participants 102a-n are required. However, as will be elucidated below in conjunction with examples and embodiments, call quality improvements are especially helpful as the number of participants 102a-n increases due to the increased number of data pathways being relied upon.

Note that while a one-to-one ratio of participant to device is illustrated for the sake of simplicity, it is entirely within the scope of this disclosure that there may be multiple participants 102a-n on any one device if they are concurrently located.

As previously noted, devices 104a-n may refer to any number of device types, not only cell phones as illustrated herein. In some embodiments, the systems and methods disclosed herein may be particularly formatted in order to operate on such mobile devices, since call quality and ability to understand may be most heavily compromised on such mobile devices; however, in alternate embodiments the systems and methods of call quality improvement disclosed herein are equally able to be implemented on a wide array of devices (i.e., laptop and desktop computers, game consoles, dedicated teleconferencing equipment, etc.).

The devices 104a-n couple to a communication and visualization server 108 via a network 106. The network 106 most typically includes the internet, but may also include other networks such as a corporate WAN, cellular network, or combination thereof, for example. The server 108 mediates communication traffic between the various devices 104a-n. The server 108 may access a data store 110 for device/participant credentials, to store call data or other data of interest (metadata for example).

As previously disclosed, one of the largest problems facing CON systems is the fact that data is typically transmitted via the internet, which is a "best effort network". Best effort network means that the data is transmitted with the best timing and quality reasonably possible. As such, the timing and/or quality of the data received are typically compromised. In the circumstances where the network is entirely broken, backup channel(s) may be employed in order to ensure that the call is still operable.

Typically, data transferred over the internet can be repaired as retransmissions are received, or as late packets are re-integrated. However, in the context of human discussions, waiting for late packets, or packet retransmission, is often undesirable due to the latency caused in the speech. People naturally wait a very short time after they finish speaking before they become impatient and expect some kind of response. The period of time varies by individual, and by culture; however, typically 200-800 ms delay between the end of a speaker talking, and a response causes the speaker to wonder if they were heard. If there is a response delay of longer than 200-800 ms, the speaker will often repeat information, or query the other participants' whether they heard what was spoken. This makes sense in face to face communication, but in circumstances where there are network delays, this repetition often causes speakers to talk over one another, or otherwise miscommunicate.

As such, current call over network systems typically limit the length of a network delay. By limiting delay, the number of late packets that can be successfully re-integrated is likewise limited, thereby reducing quality of the call. In poor network conditions that may cause the call quality to fall below an acceptable threshold. These existing CON systems respond by dropping the call.

Dropped calls are obviously very problematic for the callers; especially when there are a number of callers involved. The ability to reduce dropped calls, and still operate under sub-optimal network conditions, is a major advantage provided by the currently disclosed systems and methods.

The current system handles poor quality networks by a sophisticated combination of network pathway testing (to ensure the best pathways are utilized), and variable delay buffers that operate based upon call scenario, and balancing quality and timing needs. These systems and methods will be described in more detail below.

Figure 2:
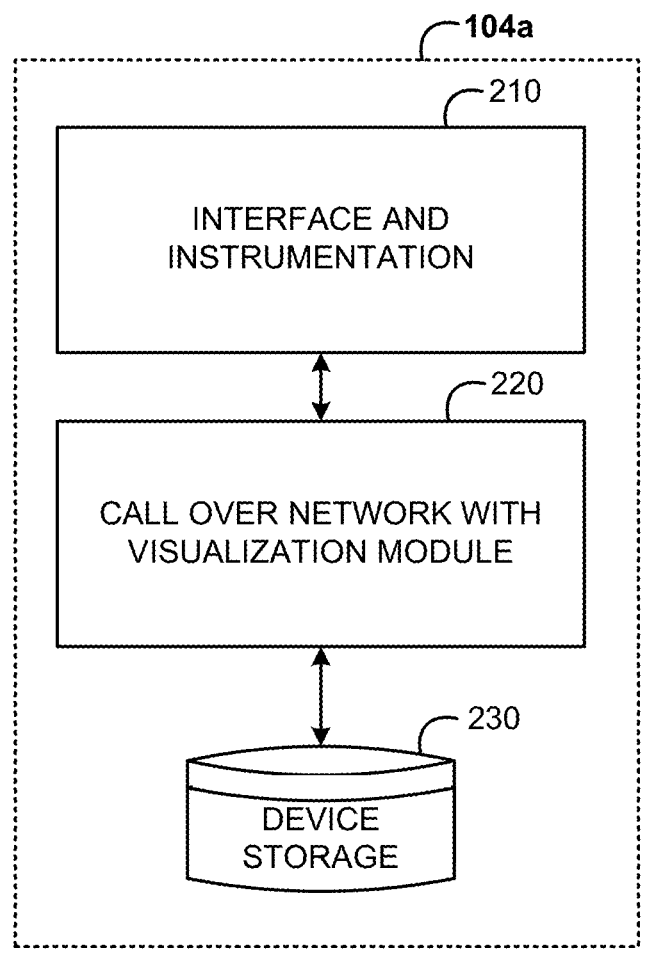
FIG. 2 is an example schematic block diagram for a communication device used in conjunction with a call over network, in accordance with some embodiments.

Much of the call quality improvements provided herein requires interplay between the devices 104*a-n* and the associated software stored thereon, and the server 108 which is able to parse out and transmit information between devices 104*a-n*. FIG. 2 is an example schematic block diagram for one such communication device 104*a* used in conjunction with a call over network 100. This illustration the device is seen as including at least one interface and the instrumentation 210 required to effectuate the call. At a minimum this includes one or more displays, speaker, microphone, and input devices (touch screen, keyboard, etc.). The device 104*a* also requires a means to transmit data to and from the network 106. This may include a Wi-Fi connection, cellular connection, or other connection type as is appropriate for the present device 104*a*.

In addition, it may be desirous to have additional functionality that required specialized instrumentation, such as GPS, vibration, biometric collectors, temperature sensors, etc. The specific functionalities that may employ such specialized instrumentation will be explored in greater detail below.

The instrumentation and interface 210 couples, physically or logically, with a call over network with enhanced call quality module 220, which typically includes computer readable instructions on non-volatile device storage 230, and executed via one or more processors. In the instant example, the enhanced quality features provided herein are displayed as being implemented in conjunction with call visualization. While this is not required, in some embodiments these two features may be employed together to generate the best user experience. As such, many of the examples provided herein will illustrate visualization being performed with call quality improvements.

Figure 3:
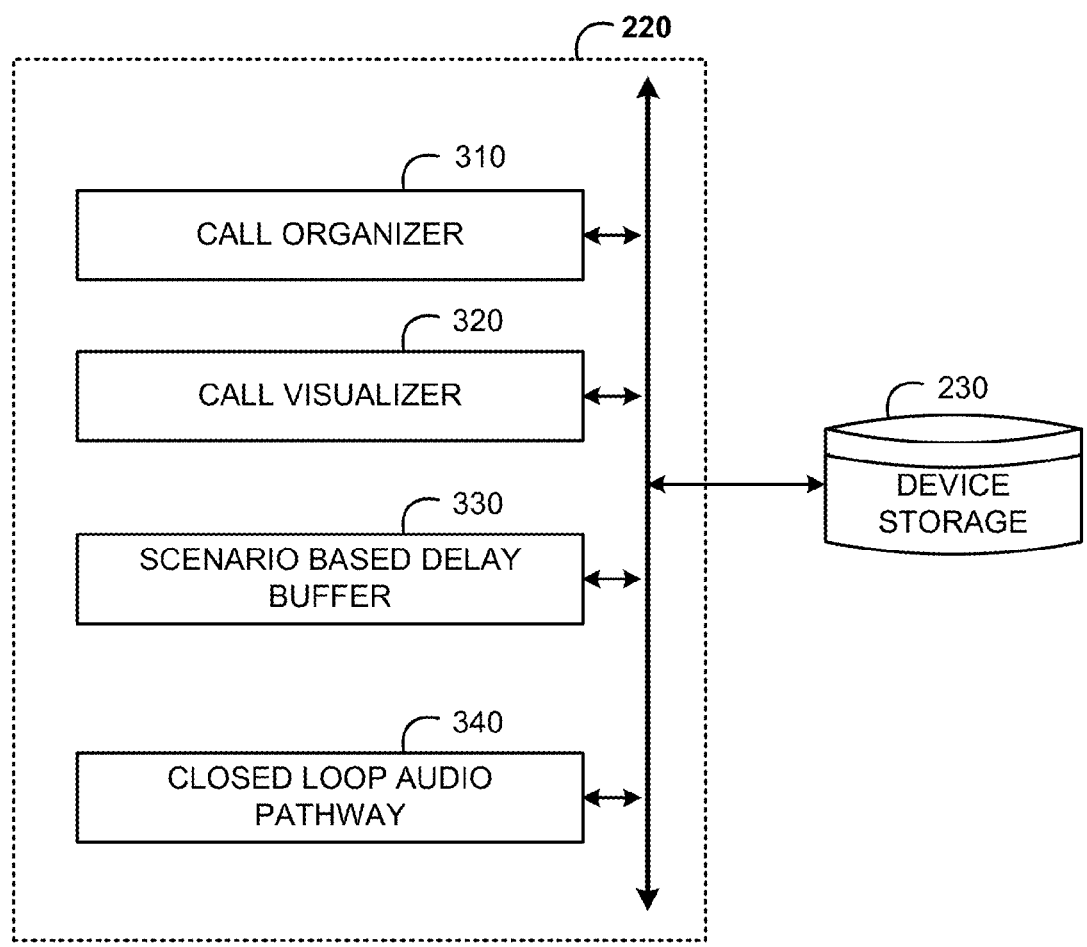
FIG. 3 is an example schematic block diagram for more detailed view of the visualization module of the communication device, in accordance with some embodiments.

FIG. 3 is an example schematic block diagram for a more detailed view of the call over network module 220 of the communication device 104*a*. The call over network module consists of two primary components in this example: visualization modules, and call quality modules. The visualization modules include a call organizer 310 and a call visualizer 320. The call quality modules include a scenario based delay buffer 330, and a closed loop audio pathway tester 340. As noted previously, the visualization need not be performed along with quality improvements; however, these two features operate synergistically to provide more efficient calls.

The call organizer 310 is responsible for the scheduling and initiation of a call. In contrast, the call visualizer 320 is responsible for the actual visualization features during the call, and, in some embodiments, is capable of producing highly visualized summaries of the completed calls. The call organizer 310 and the call visualizer 320 will be described in considerable detail below.

The scenario based delay buffer 330 makes contextual decisions in order to vary the delay buffer length in a manner that optimizes call quality while maintaining acceptable levels of latency. The closed loop audio pathway tester 340 provides a novel means for determining call quality, and initiating data path optimization. These two call quality enhancements will likewise be described in considerable detail below.

The call organizer 310 and call visualizer 320 are capable of accessing the device storage 230. The call organizer 310 may access calendar information stored on the device for the participant in order to assist in call scheduling. Likewise, scheduled calls may be stored in the device storage 320 for reminder when the date and time of the call draws near. Likewise auto calendar population with scheduled calls may be enabled, in some embodiments. Likewise, the call visualizer 320 may utilize the device storage 320 for storing of call summaries and for contact information, for example.

Figure 4:
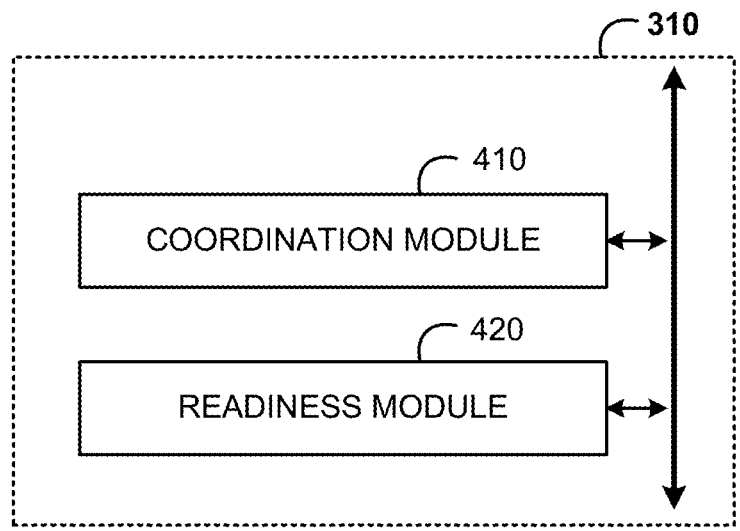
FIG. 4 is an example schematic block diagram for more detailed view of the call organizer of the communication device, in accordance with some embodiments.

Moving on, FIG. 4 is an example schematic block diagram for more detailed view of the call organizer 310. As previously mentioned the call organizer provides two functions: the scheduling of calls by the call coordination module 410, and the initiation of calls by the readiness module 420. While a call may be initiated on the fly, more often large conference calls require early scheduling in order to ensure availability of the parties. The coordination module 410 is the component responsible for ensuring that the required data is available to properly schedule the call. This includes querying participants' calendars in order to suggest times which minimize conflicts. The coordination module 410 may then save the scheduled call on the device calendar (or synchronize with some other scheduler). Additionally, in some cases the coordinator may generate reminder instant messages, emails, push notifications, or the like to remind the participant 102*a* of the scheduled call.

The call readiness module 420 becomes more prominent as the call draws close in time, and enables participant 102*a* interaction pre-call to ensure that confusion over the call is minimized. Currently, a call typically starts at the allocated time, and the next five to fifteen minutes are spent doing nothing productive as the participants' attempt to contact missing members, make sure everyone can hear properly, etc. This can be a major drain on time, and can unnecessarily extend a conference call.

The readiness module's 420 primary mechanism to ensure proper call start time is to delay the call initiation until the required participants are present. This is accomplished by enabling a dialog box that promotes open communication between the participants as they become available. In this manner people are not left guessing if additional members are to join, or the timing of everyone's readiness. The dialog box may, in some embodiments, be populated by quickly selected messages, or via a custom message. For example, if the user is in a meeting that is taking longer than originally planned, the user may wish to discretely select a message stating "Be there in 15 minutes" in order to not disturb others. Alternatively, a participant may wish to provide a more detailed message, that more effectively communicates their status, such as "Running late, start without me and I'll catch up."

An indication of the status of the device, other participant's 102*a-n* readiness, and the device 104*a-n* readiness of the other participants' 102*a-n* may be provided to the participant 102. In some cases, during call scheduling, essential participants 102*a-n* may be indicated by the call organizer. This enables the call to start once all essential participants' are ready (referred to herein as a quorum). Often all members to a call are not needed, but a core group is required otherwise the purpose of the call is moot. This feature enables calls to start in a manner that minimizes the waste on each participant's respective time.

Figure 5:
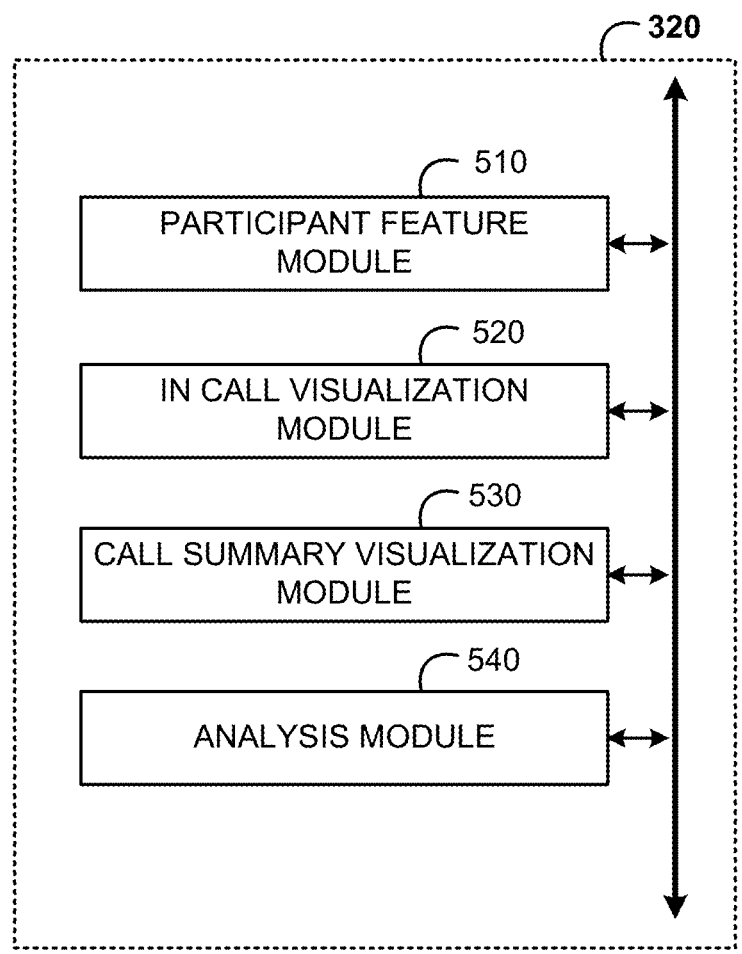
FIG. 5 is an example schematic block diagram for more detailed view of the call visualizer of the communication device, in accordance with some embodiments.

After the call has been initiated, the call visualizer 320 provides visualization functionality during the call's progression, and for the summary of the call. FIG. 5 is an example schematic block diagram for more detailed view of the call visualizer 320. The first major advantage provided by the visualizer 320 is the enablement of far more participant features during the call, via a participant feature module 510. For more information regarding call visualization reference co-pending U.S. application Ser. No. 62/018,520, which is hereby incorporated herein by reference.

The visualizer 320 then enables in call visualization of who is speaking, and their interactions via an in call visualization module 520. The call visualization module 520 provides a novel way of displaying who is speaking in a chronological order. This may be displayed in a single channel, or as multiple channels. The benefit of displaying the audio in this manner is that the participant can easily follow the flow of the conversation between users.

The call visualization module 520 also enables the display of other participant's actions (such as using the speaker request or feedback functionalities discussed previously). Since the audio data is displayed chronologically, these user interactions may be displayed in context to the conversation in which they are being employed. This provides the participant with a far more complete understanding of all other callers' thoughts and perceptions of a given topic. A series of examples will be explored below to provide clarity to the visualization process.

After the call is concluded, a call summary visualization module 530 may compile the call information in a manner that enables better participant understanding and call clarity. Summarization may be aided through the usage of analytics performed by an analysis module 540. At the root of the call summary is the actual recording of the conversation. In some cases, late packets can be re-integrated into the recording to ensure higher fidelity. The recording can be appended by any number of analyses in order to generate a summarization. Also, as in the above disclosed visualization, the call summary may likewise include a chronological visual summary of the call.

Lastly, the summary can be conveniently exported to contacts, or otherwise emailed, in order to enhance the effectiveness of the conference. In some cases, the call may be configured to prohibit, or otherwise limit sharing, in the case of more confidential information.

Analytics may include emotional mapping, voice tagging, scenario recognition, audio to text conversion, and even predictive audio repair. These analytical processes are disclosed in considerably more detail in the cross referenced disclosure.

Figure 6:
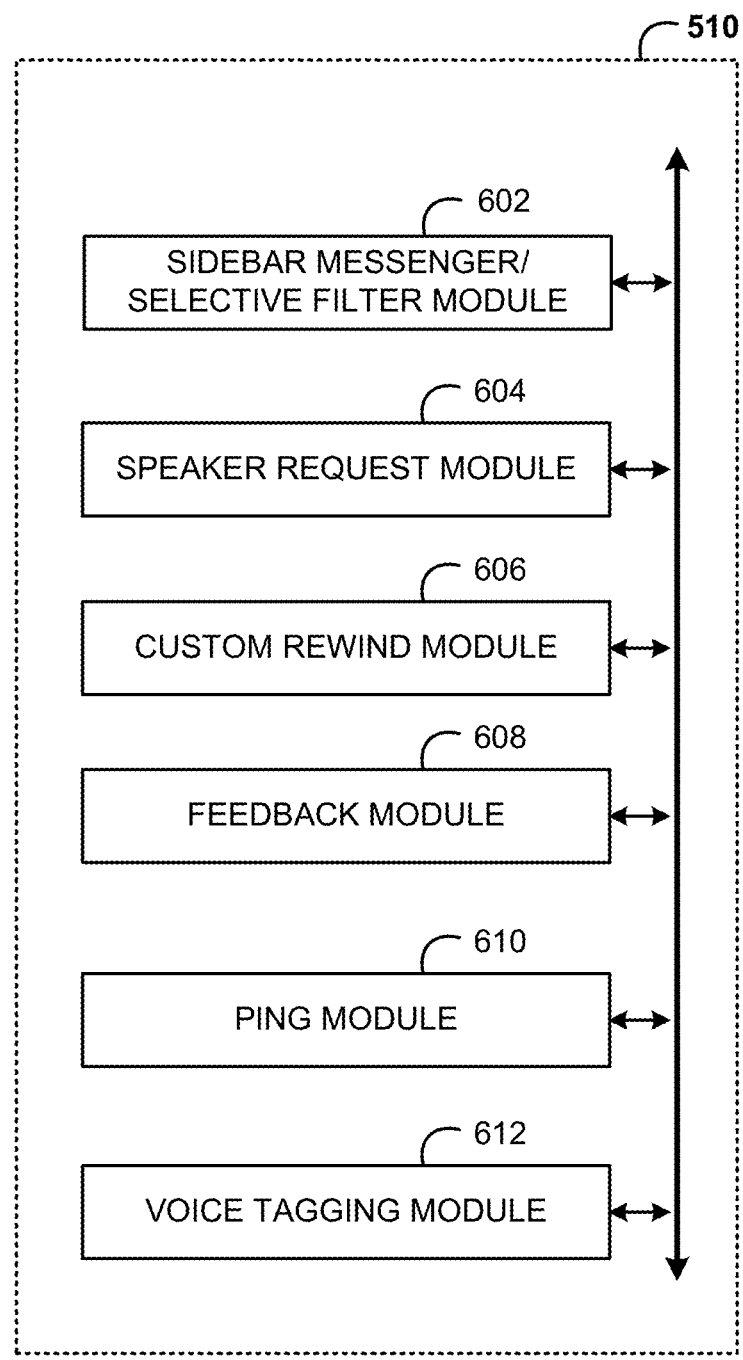
FIG. 6 is an example schematic block diagram for more detailed view of the participant feature module of the communication device, in accordance with some embodiments.

Moving on, FIG. 6 is an example schematic block diagram for more detailed view of the participant feature module 510. Examples of features included within the participant feature module 510 include a sidebar messenger 602, speaker request 604, custom rewind 606, feedback 608, ping capability 610, and voice tagging 612, in any combination and in conjunction with any other known feature set. These participant functions generate a more immersive, and data rich, call experience that enables better visualization and call efficiency.

The sidebar messenger module 602 leverages off of current text messaging functionality already present in a number of CON systems. Current messaging capabilities typically send out a typed message to the entire group, or in more advanced systems, to a specific individual. The currently disclosed sidebar module 602 goes a step further and enables the participant to send a message to any subset of the total participants. This may be of particular use where a message should go to multiple members, but not others (in remote negotiations for example). Further, in some embodiments, this feature is not limited to text messaging, but may also include filtering audio to only the intended recipients. Thus, a participant may select as many members as he would like to communicate with, and make sure only those members hear the audio being spoken. This may likewise be useful when a participant wants to quickly ask a question for clarification without disrupting the bulk of the participants' conversation.

The speaker request module 604 enables the participants to select an indicator that tells the other participants that they wish to talk. Often, with multiple parties on a call, speakers overlap as they try to speak. Sometimes the speakers don't even realize they are speaking over one another, and the resulting audio is incomprehensible to the other participants. By providing an indicator that shows all members someone wishes to speak, participants are spared the need to break into another person's conversation in order to be heard.

The custom rewind module 606, is one of the largest time-saving features to the presently disclosed systems and methods. Due to network bandwidth fluctuations, temporary interferences, or simply lost or late packets, calls over network are inherently of poorer quality than ideal. Moreover, even when the audio and/or video data is flawless, people sometimes misunderstand what is being stated for a whole host of reasons. This is currently resolved by a participant merely missing out on some information (which reduces call effectiveness), or requires clarification by the participant (which wastes time thereby reducing call efficiency). Rather than requiring constant clarification, the presently disclosed functionality enables the participant to rewind the live call a configurable amount of time and re-experience the unclear portion of the call. A significant portion of the time, re-experiencing a few seconds of the conversation can clarify what would ordinarily require a full disruption of the call. In some embodiments, the re-played portion may be sped-up (for example 150%) in order to catch the participant up to real time conversation quickly. This ensures that the participant does not get left out of interacting with the conversation for long. The audio playback during this sped-up replay may be frequency modulated to ensure the audio has as normal a sound as possible (i.e., avoiding the "squeaky voice" that sped-up audio is known for). Alternatively, the replayed portion of the call may be layered over the current call discussions in a "whisper mode" whereby the replay is reduced in volume, and optionally modulated in pitch, in order to mimic a person whispering the missed portion of the conversation. Most people are capable of following two conversations at once if they are so presented, and this enables the participant to remain part of the conversation while still re-experiencing call segments.

Further, while a few seconds does not sound like much time to the human perceiving the call, this time enables late packets of information to be re-integrated into the replay. Thus, the rewound play-back may be of superior quality as compared to the original experience. This too reduces confusion, and greatly increases call efficiency.

The feedback module 608 enables the participants to include feedback that can be visually displayed to other members. In the simplest of forms this could merely be a "thumbs-up" or "thumbs-down" designation to indicate agreement, or not, with what is being discussed. However, it can easily be seen that such non-verbal feedback could include a whole host of voting selections, mood indicators, or the like.

The ping module 610 enables a participant to send a ping to one or more other participants. Where the participant's devices have vibration ability (as with most phones), the ping could include a short vibration sent to the other participant. Likewise, the ping could include an isolated audio alert, or a visual alert (for example the pinging participant's icon could flash on the pinged participant's display).

Lastly, the voice tagging module 612 enables the participant to tag a voice against a contact list. In future conversations the voice may be recognized, and likewise tagged automatically.

Figure 7:
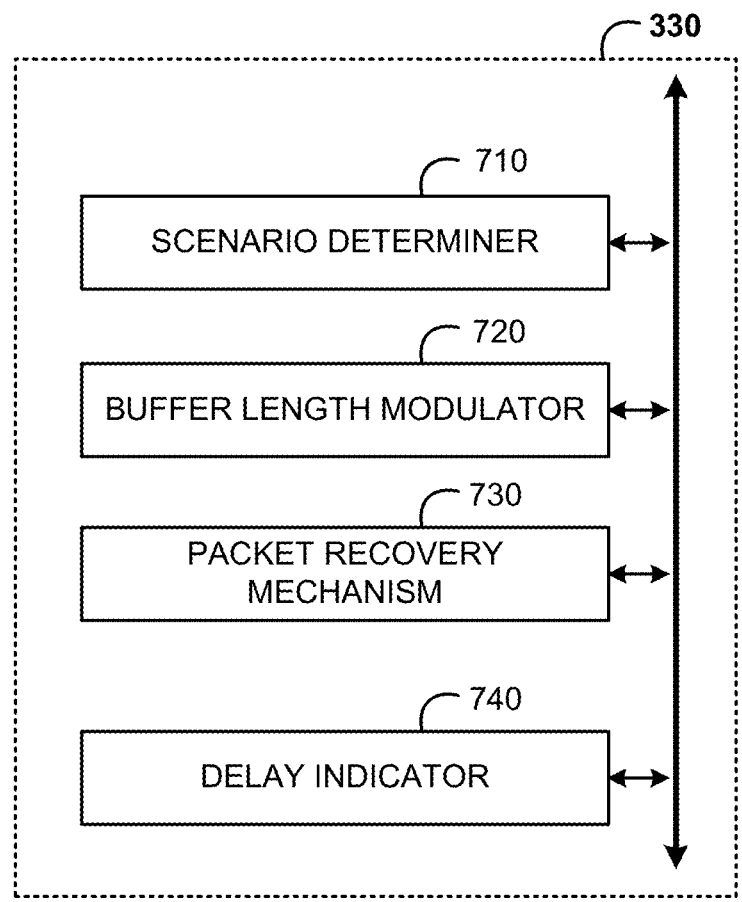
FIG. 7 is an example schematic block diagram for more detailed view of the scenario based delay buffer of the communication device, in accordance with some embodiments.

Moving on to FIG. 7, a more detailed view of the scenario based delay buffer 330 is provided. In this example block diagram, a scenario determiner 710 may analyze call format and even call content to glean the call's scenario. For example, a presentation has a very distinctive format whereby a single speaker lectures for the majority of the time, typically with questions interspersed or clustered at the end of the call. This pattern can be readily identified and the call labeled accordingly. Likewise, a board meeting also has a defined format whereby a quorum is established, last meeting notes are reviewed, and matters are voted upon. This, in turn, differs from a conversation, in which the participants take turns speaking without an apparent format. This module may be able to identify any number of such call archetypes.

The purpose of determining the call scenario is that the acceptable buffer delay may be augmented according to the scenario of the call. For example, a lecture, where one person is speaking at length, can have a longer buffer delay without interfering with the call flow. In contrast, a conversation where participants are rapidly speaking back and forth is more readily disrupted by delays, and as such, greater weight will be placed on reducing latency.

The buffer length modulator 720 takes the scenario, acceptable quality, and network condition into account in order to modulate the buffer length. Clearly in an optimal network situation, delays are minimized because the data quality is excellent. However, in more challenging network environments, initially a lower bit rate codec may be employed. If this is insufficient to resolve the problems caused by the poor network, then the delay may be increased in order to ensure that late or retransmitted packets can be received and reintegrated into the call. Thus, there becomes a balancing act between acceptable delays, and acceptable call quality. This balancing act may be weighted differently based upon call type. For example, if a caller is lecturing, a longer delay is acceptable (favoring increased call quality). In contrast, if the call involves rapid changes in who is speaking, as is typical in a discussion, then a shorter delay may be needed (at the expense of quality).

During the delay, a packet recovery mechanism 730 may receive late data packets and re-integrate the data to improve the call quality. A number of known packet recovery methods are currently known, such as retransmission of lost packets, and any such means may be employed by the packet recovery mechanism 730.

However, in some situations, network connectivity may be so bad that even meeting basic call quality levels requires significant delays. For example, in very poor network conditions delays up to a number of seconds may be required. Current call over network systems merely drop the call in such situations. However the current systems and methods may include a delay indicator 740 which enables a workable means to have such delays without the common issues associated with them (impatient speakers, speakers talking over one another, etc.)

When delays are moderate, say less than 800 ms for example, the system may operate without a delay indication, as most users are comfortable with such a delay and impatience won't become an issue. However, in order to accommodate longer delays, the delay indicator 740 introduces an indication after the speaker is done talking that a delay is present. Often this delay indication includes a replay of the audio portion synched to the timing the other participants' are hearing it. In other embodiments, this replay may be offset by a configurable time in order to minimize the perception of the delay, and leverage a person's natural tendency to wait for a response.

For example, assume there is a very poor network connectivity that requires a 2 second delay in the audio in order to have sufficient quality. After speaker A finishes his sentence, the last few words of what was spoken may be repeated to speaker A to make him aware that the communication is being delayed to the other participants'. As most people are comfortable with up to an 800 ms pause between speaking, in this example the last 1.2 seconds (2 seconds-800 ms) of speaker A's audio may be replayed back to him. In this way, speaker A is aware his audio has been delayed, and he will avoid speaking over another caller, or otherwise become impatient due to a lack of an immediate response.

Of course alternate means of indicating a delay are also possible. For example, in some embodiments, a visual indicating may be provided illustrating that the other participants' are still receiving the audio. Alternatively, both a visual and audio indication may be utilized.

Figure 8:
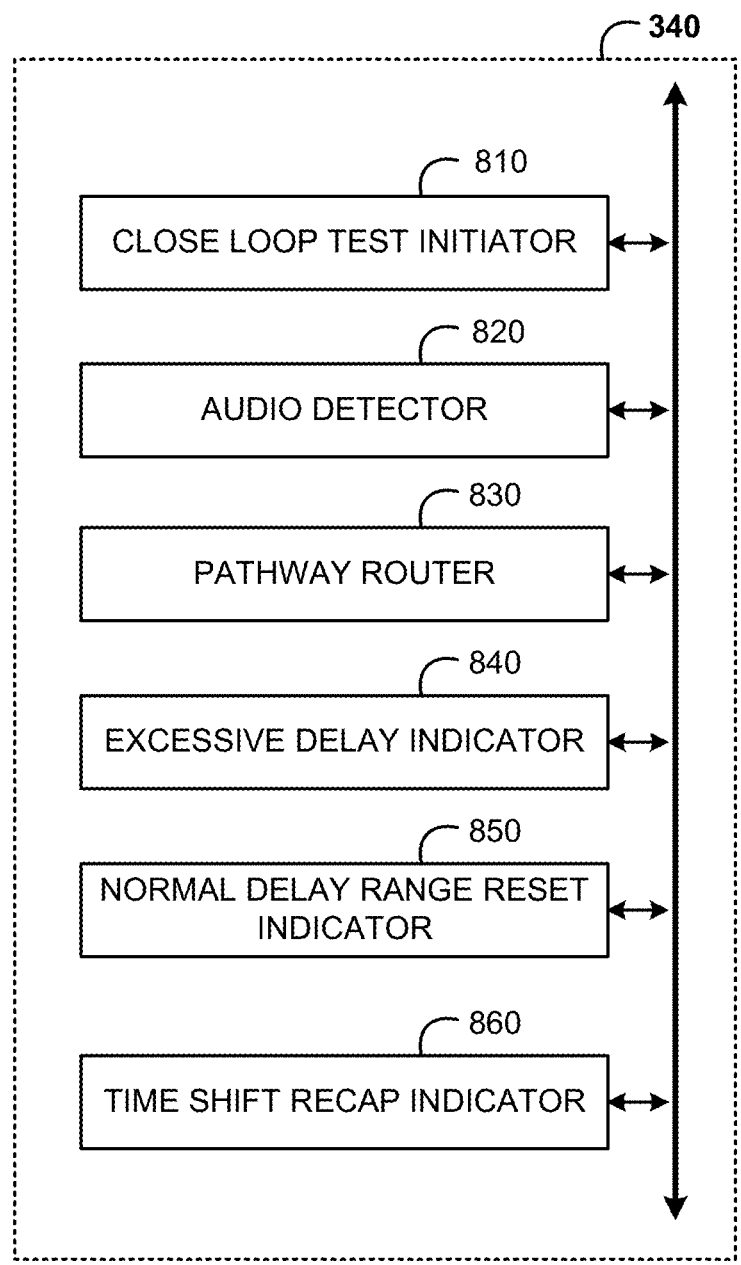
FIG. 8 is an example schematic block diagram for more detailed view of the closed loop audio pathway of the communication device, in accordance with some embodiments.

FIG. 8 provides a more detailed example block diagram for the closed loop audio pathway 340 tester. The loop audio pathway 340 is configured to test a plurality of pathways in order to determine which pathway provides the best quality call. A close loop test initiator 810 starts the test using the device speaker. The initiator 810 can be launched automatically by the system, or may be initiated by the user to check call status. The audio is received via the device microphone and quantified by the audio detector 820.

The pathway router 830 determines a number of data pathways to route the data. The pathway routing is multi-path and multi-relay in order to determine the best route for data transmission. The results of the different pathways are measured to determine network transmission issues.

Several kind audio feedbacks are introduced to indicate changes in channel delays. This is to better reflect the best effort nature of public internet. Without network layer QoS enabled, packet loss and excessive delays will always happen. To help users better leverage this type of communication channel, such indications are necessary and helpful.

An excessive delay indicator 840 and the normal delay reset indicator 850 receive the audio feedback, and use the feedback to determine if an extended delay is needed, or whether a more normal delay is sufficient. A time shift recap indicator 860 may provide an indication to a user if another participant is doing a time shift recap. These feedbacks help users better understand the communication status of the call, therefore increasing communication effectiveness.

In addition to pathway testing and scenario based buffer length modulation, the network itself may be improved in order to ensure better cal quality. This network improvement may rely upon software modules that are deployed between the communication devices and the backend servers. The modules may be distributed geographically, and may be incorporated into existing cellular base stations and WiFi Aps. Since no additional network infrastructure needs to be physically deployed, this kind of network improvement may be readily, and cost effectively, deployed.

Traditionally, an audio packet is sent from the device to the network through the Wi-Fi AP then to the ISP to the backend servers. This process takes time, typically on the order of 30 ms. Once at the servers, the packets may be analyzed for loss, and if lost packets are identified there may be a recovery attempt made. However, since the audio data is being transmitted in real-time, too much delay may interrupt the conversation. As such there is often only enough time for a single recovery attempt.

By distributing these modules geographically close to the communication devices, they are able to intercept audi packets early, and perform loss analysis. The latency here is far less, on the order of 1 ms, thereby allowing for a number of recovery attempts to be made if data is missing. The date is then routed to the backend servers with much higher fidelity than under traditional systems.

By geographically distributing these modules, and performing rapid packet loss and recovery, the real time audio conversations may be accelerated compared to all existing network structures currently being employed.

Figure 9:
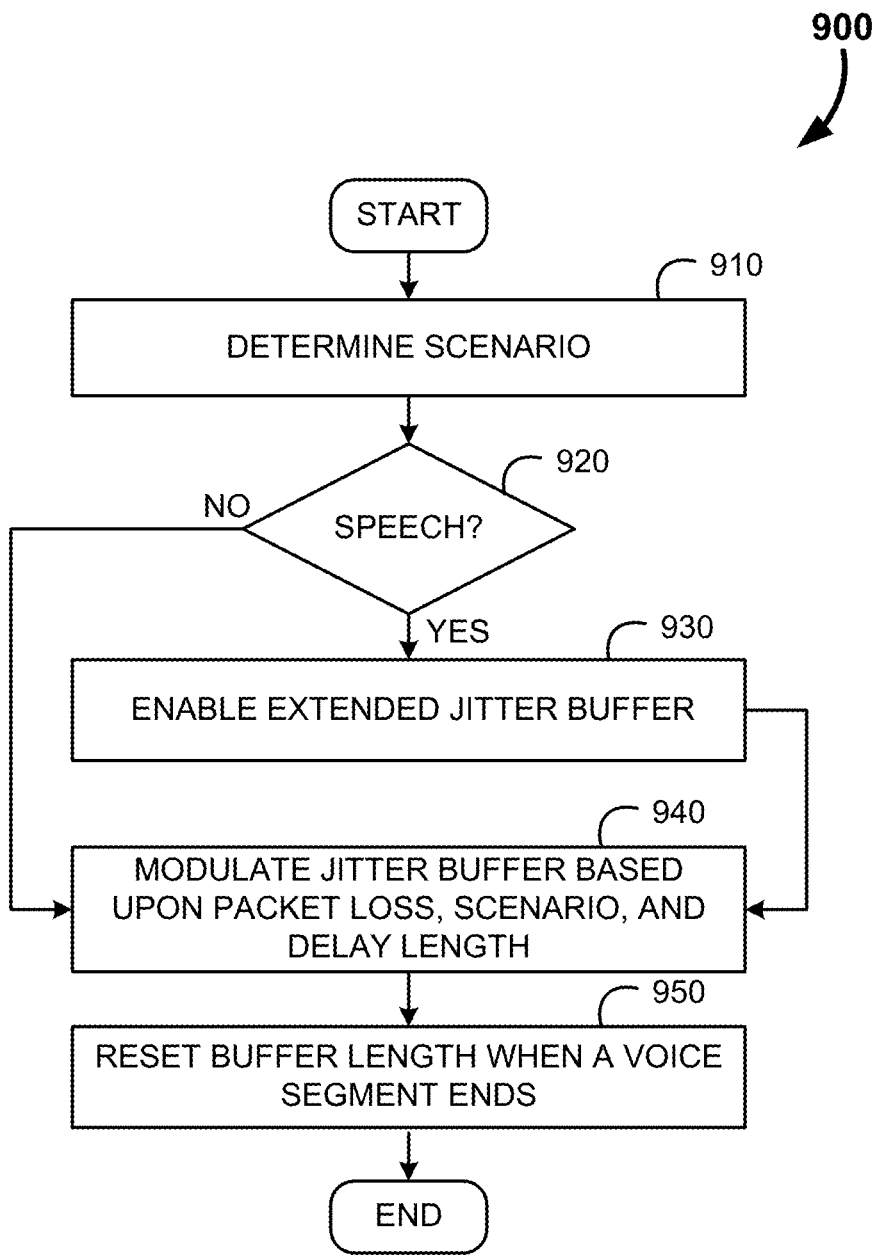
FIG. 9 is an example process flow diagram for delay buffering of a call over network based upon call scenario, in accordance with some embodiments.

Now that the systems of improving the quality of a call over network have been provided, attention will turn to FIG. 9 which provides an example process flow diagram for modulating buffer delay based upon call scenario, shown generally at 900. This process begins with the determination of the scenario type (at 910). As previously disclosed, scenario determination may occur via the monitoring of who is speaking and the duration each speaker talks for. Scenario type is important because different call types may impact the allowable delay length.

For example, if the scenario is a speech (at step 920), then the jitter buffer may be extended (at 930) as compared to other scenario types. The length of the jitter buffer is ultimately determined based upon the following factors: packet loss (quality), delay length, and scenario type (at 940). In some embodiments, a basic threshold of quality is required, and the delay length is minimized. In these scenarios, the quality threshold may be static, or may be dependent upon scenario type. In alternate embodiments, a localized optimization may be performed between quality and delay length. In such embodiments, the quality and/or delay length variables may be weighted based upon scenario type.

After a voice/audio segment ends, the buffer length may be reset (at 950) so that the buffer length is normalized before the subsequent speaker. This buffer reset ensures that the user's interactions are minimally disrupted. Although not presently illustrated, excessive delays may include a delay indicator, as previously discussed, to ensure that the user is aware of the delay.

Figure 10A:
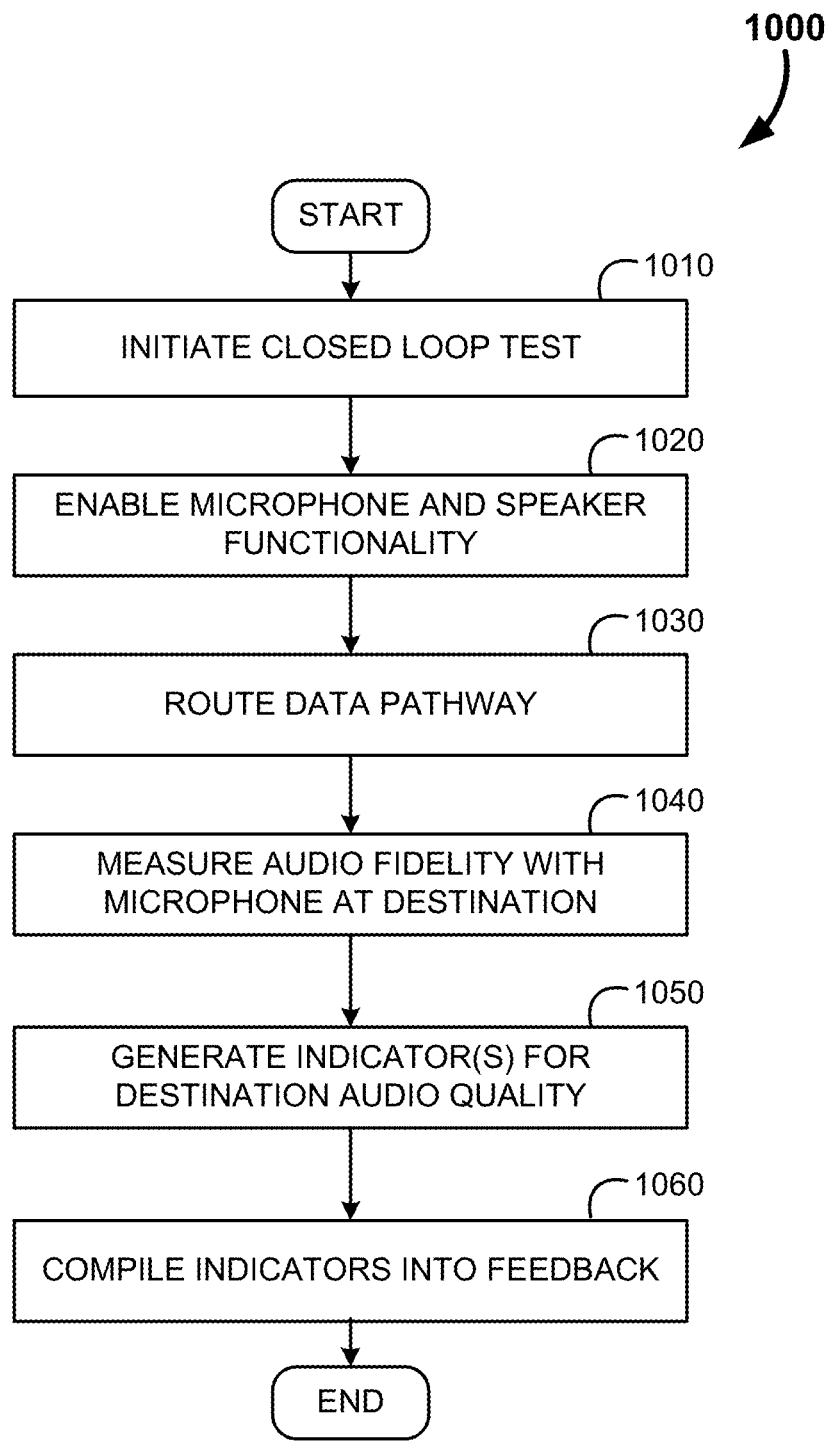
FIGS. 10A and 10B are example process flow diagrams for closed loop audio pathway testing, in accordance with some embodiments.

The call quality/packet loss levels are determined via the closed loop audio pathway test, which is described in relation to FIG. 10A. In this example process flow, the closed loop test is initiated (at 1010) either automatically by the system, or in response to a user's request. The microphone and speaker functionality are enabled on the device (at 1020) and audio generated by the speaker is captured by the microphone.

Figure 10B:
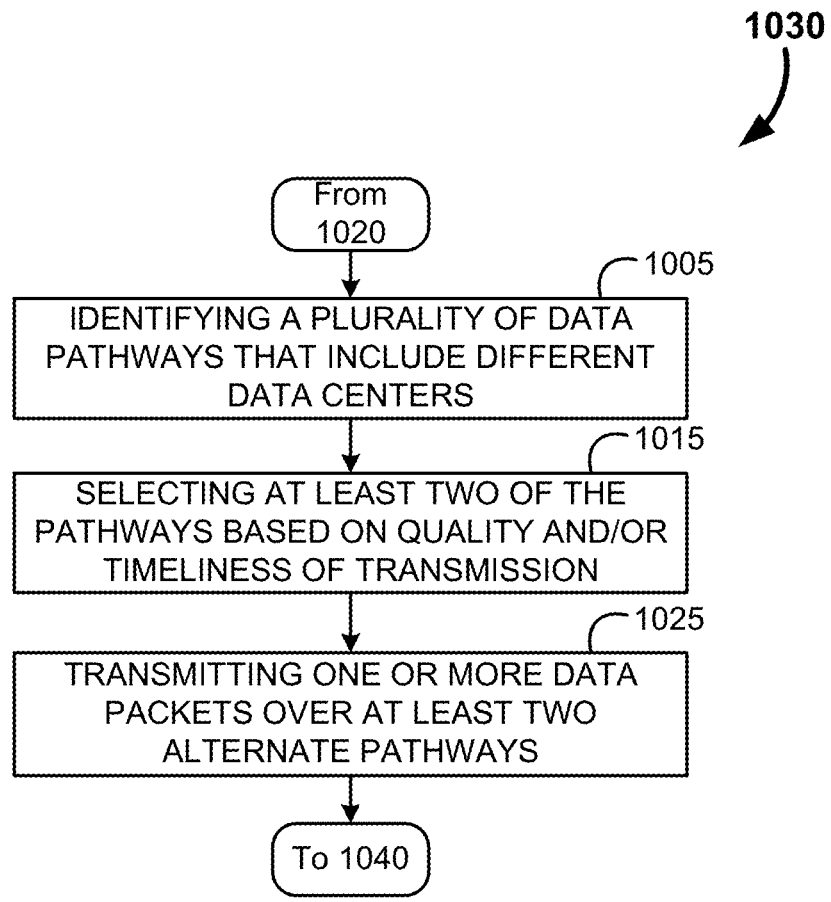

The data is then routed via multiple pathways (at 1030). FIG. 10B provides a more detailed example process for this routing. Initially, a plurality of data pathways that include different data centers are identified (at 1005). At least two of these pathways are selected based upon quality and/or timeliness of transmission (at 1015). The data is then transmitted over the alternate pathways that were selected (at 1025).

Returning to FIG. 10A, the audio fidelity is then measured at the destination using the microphone of the device (at 1040). Indicators for the destination audio quality are then generated (at 1050), and these indicators may be compiled into feedback (at 1060) regarding the quality and condition of the audio transmission. Pathways may be identified which are best utilized, and the feedback may be utilized to inform the jitter buffer of the needed delays based upon audio fidelity.

Figure 11:
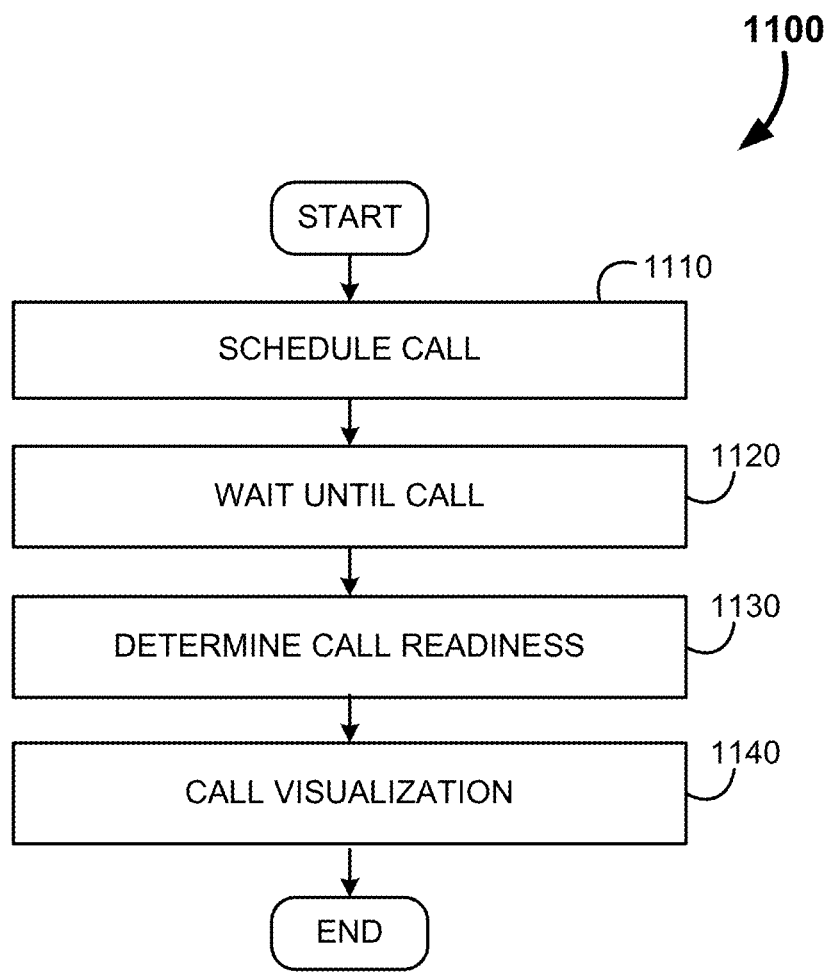
FIG. 11 is an example process flow diagram for visualization of a call over network, in accordance with some embodiments.
Figure 12:
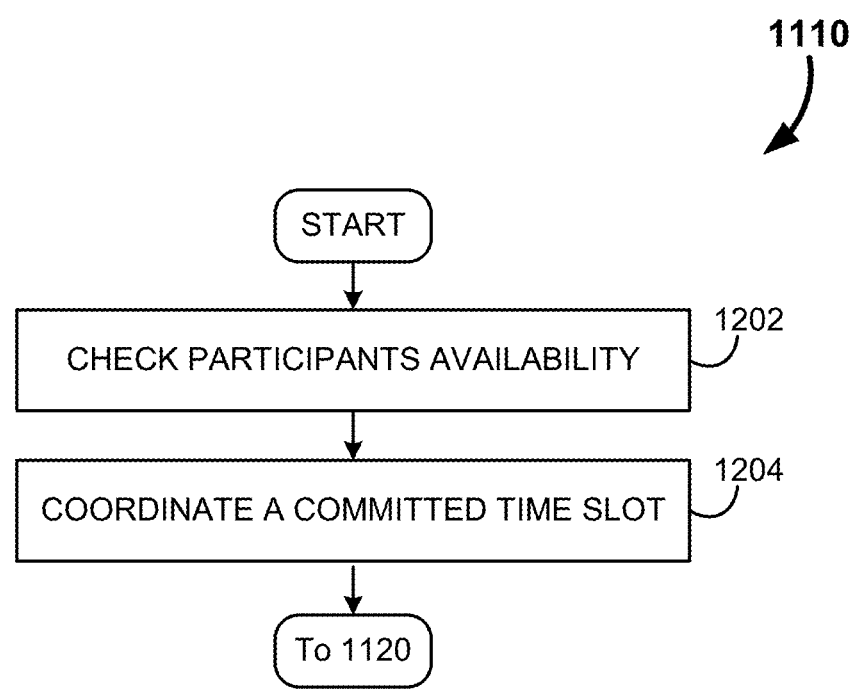
FIG. 12 is an example process flow diagram for call scheduling, in accordance with some embodiments.

Now that the quality features of the presently disclosed call over network system have been discussed, attention will be turned to the completion of a call with visualization features. FIG. 11 provides such a process flow of a call over a network, shown generally at 1100. This process begins at step 1110, where the call is scheduled. FIG. 12 is a more detailed example process flow diagram for this call scheduling, which comprises the steps of checking participants' availability (at 1202), and coordinating a committed time slot (at 1204). This checking of availability may include looking at the calendar on the device and coordinating with other participants' calendars to find a time best suited for the call. The participants may then be given the ability to provide direct suggestions, and ultimately a time slot is chosen or agreed upon. The time slot may be saved in the device calendar to ensure that the participants are reminded of the event.

Figure 13:
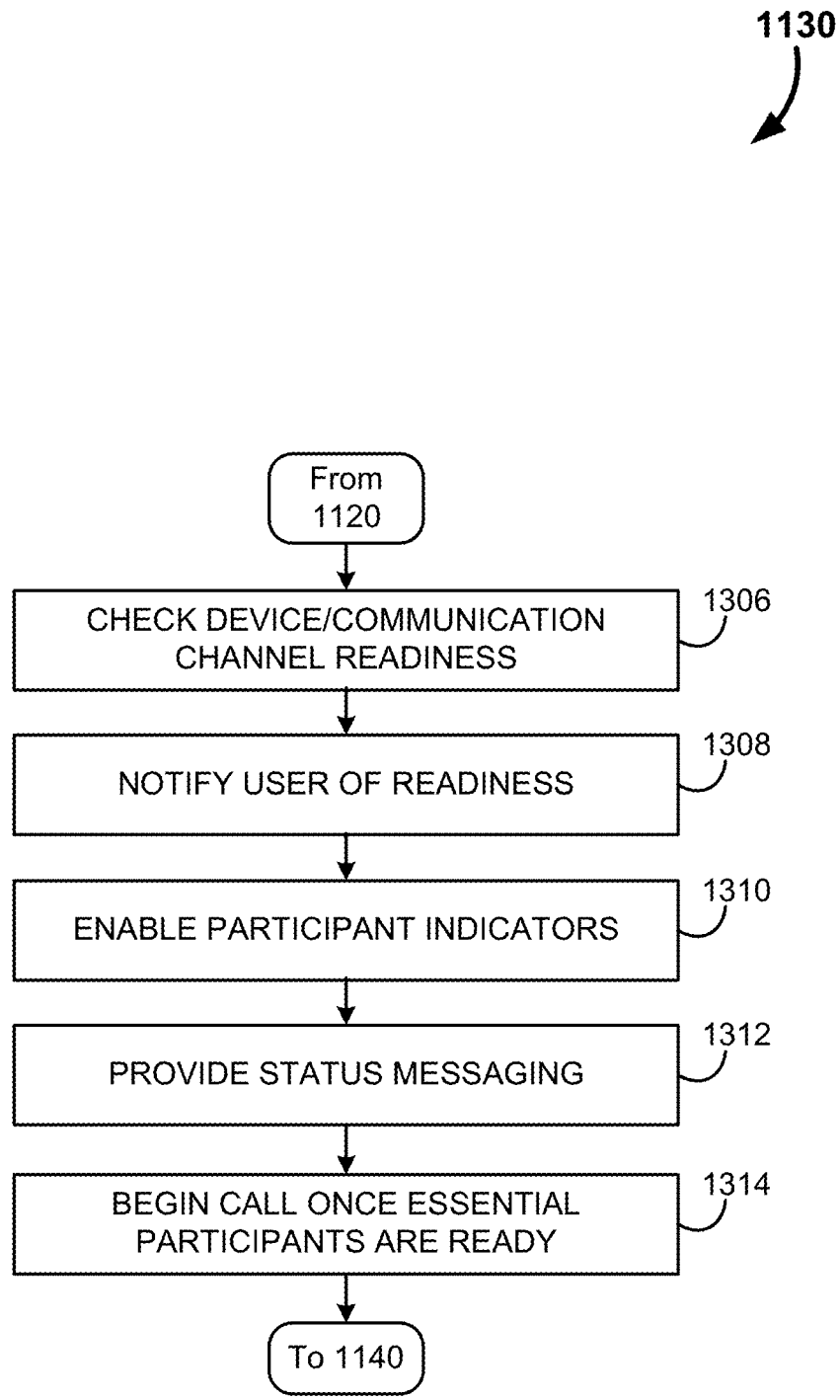
FIG. 13 is an example process flow diagram for determining call readiness, in accordance with some embodiments.

Returning to FIG. 11, after call scheduling, the process remains idle in the interim period until the call draws closer in time (at 1120). Then, as the call approaches, the process may determine call readiness (at 1130) for the device and the participant. FIG. 13 is a more detailed example process flow diagram for determining call readiness. The device is checked for readiness by querying the communication channels (at 1306) to ensure they are operating properly. The participant is also notified (at 1308) of the call, typically via a push notification and the opening of a dialog box. This dialog box forms a virtual "pre-call lobby", which enables the participants to communicate and coordinate the call start. The participants are provided the ability to display status indicators (at 1310) and status message (at 1312). These indicators may include visual references to the other participants if they are ready, busy, or running late, for example. The status messaging may include canned messages, or may include customized text, as previously discussed. Once all essential participants indicate that they are ready, the call may begin (at 1314). In alternate circumstances, the participants may force a start even without the full number of essential participants. Likewise, in alternate cases, the call may be delayed even after all essential participants are ready in order to accommodate other non-essential participants.

Figure 14:
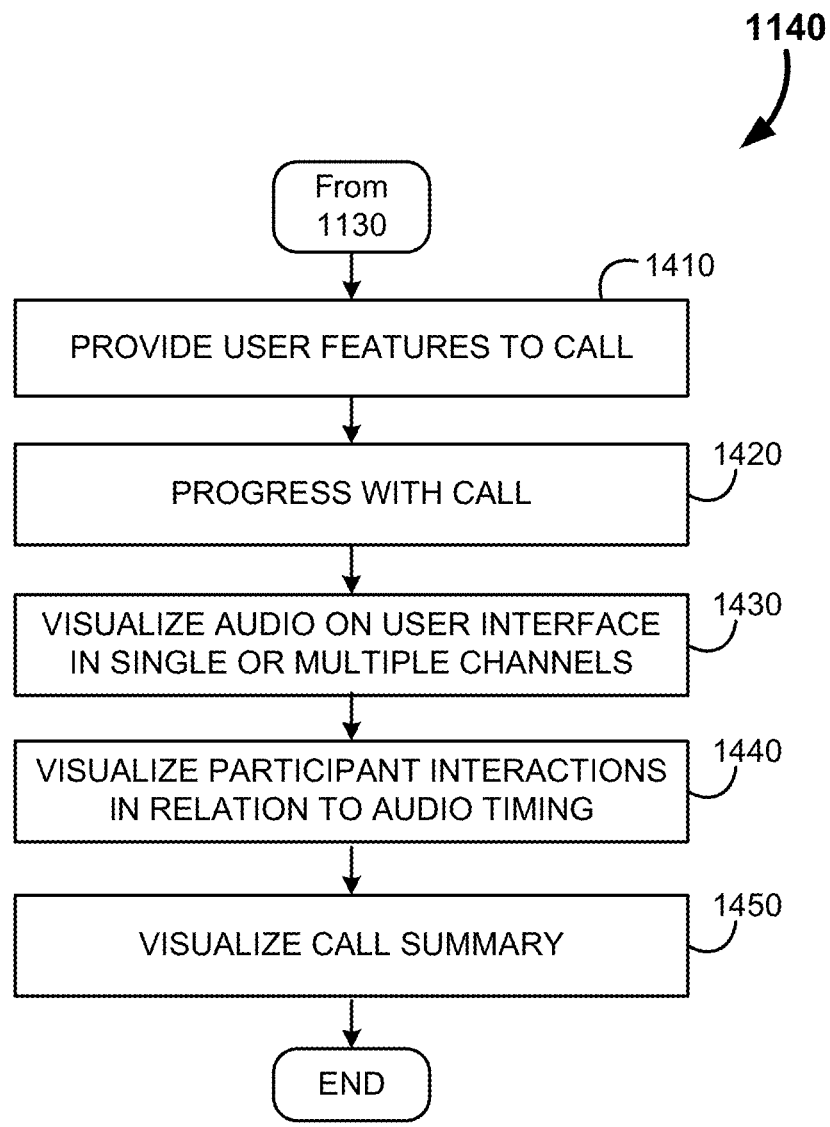
FIG. 14 is an example process flow diagram for call visualization, in accordance with some embodiments.
Figure 15:
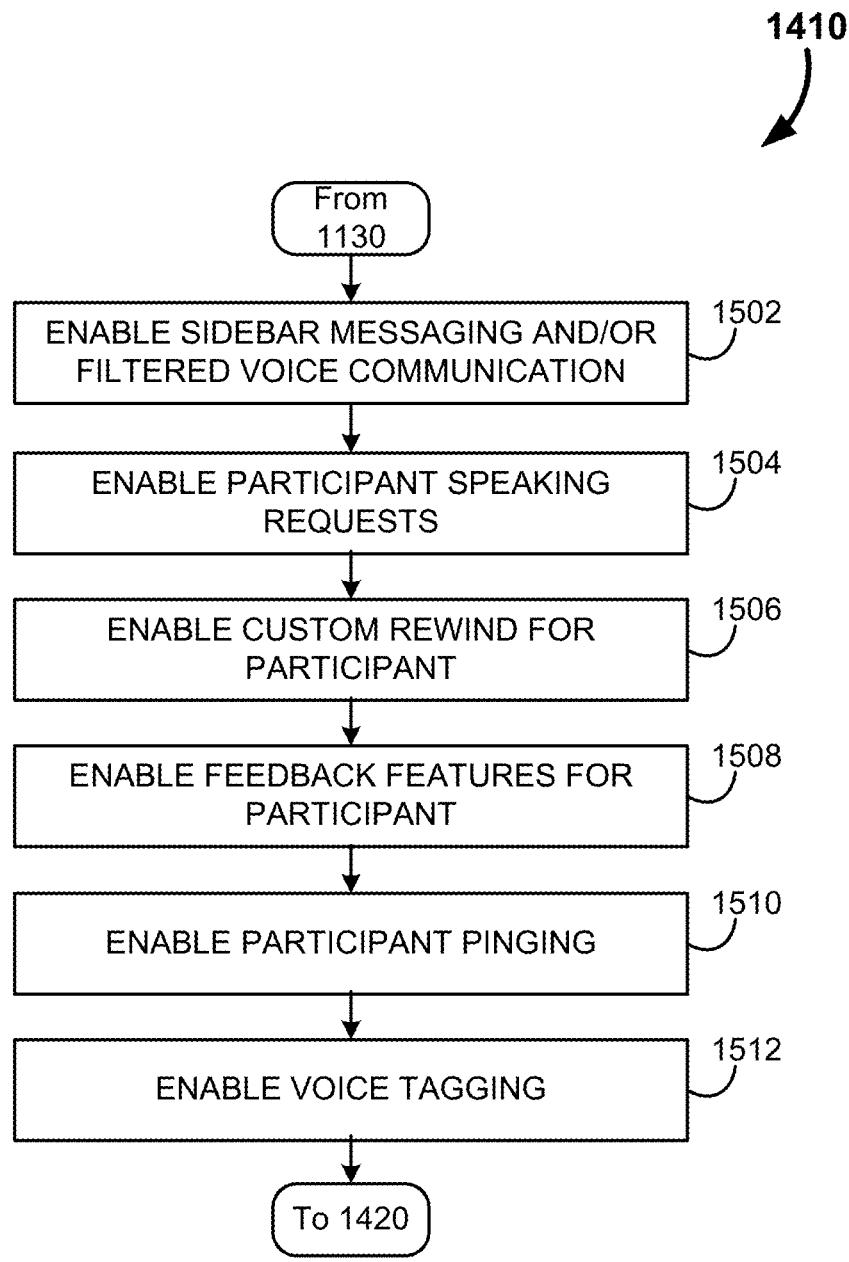
FIG. 15 is an example process flow diagram for providing participant features, in accordance with some embodiments.

Returning to FIG. 11, after call readiness has been determined, the call may be visualized (at 1140). FIG. 14 is a more detailed example process flow diagram for call visualization. In this example, call visualization starts with the participant features being made available to the participants (at 1410). Participant features include functions such as those seen in the process flow of FIG. 15. For example, the participant may be provided the ability to have sidebar messaging and/or filtered audio messaging to a select subgroup of the participants (at 1502). The participants may also be enabled to display a speaking request (at 1504). Participants can have custom rewind enabled (at 1506), and feedback features (at 1508). The participant may have the ability to ping another participant provided (at 1510), and voice tagging functions may be provided (at 1512).

Returning to FIG. 14, now that the features have been provided to the participants the call may progress (at 1420). The audio from the various participants may be visualized in a single or multiple channels (at 1430) for ease of understanding for the participant. Likewise, all the participants' interactions may be appropriately displayed to each other participant (at 1440). These interactions are displayed in relation to the audio timing to further enhance the contextual environment of the call. Lastly, the call summary may be visualized (at 1450).

Figure 16:
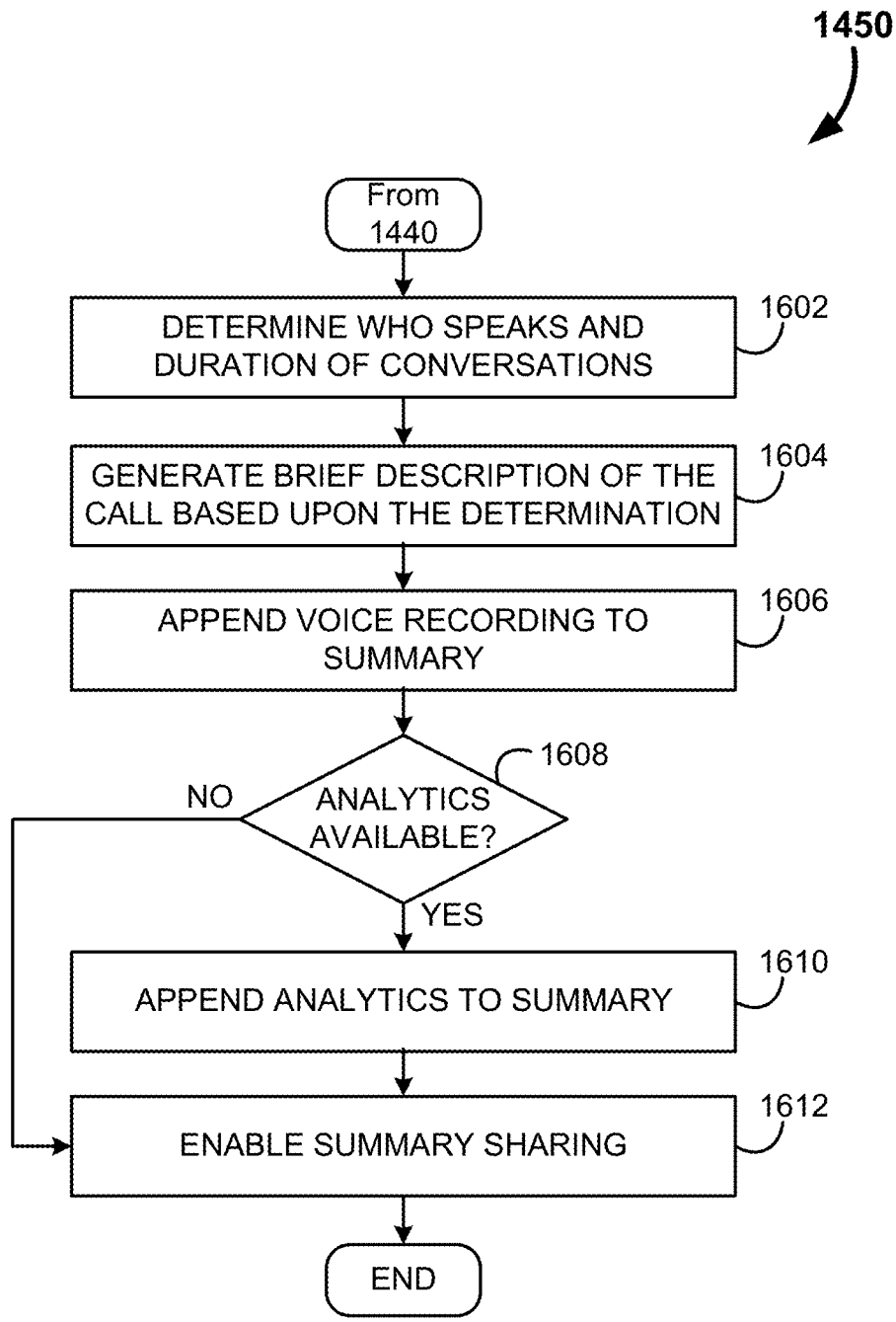
FIG. 16 is an example process flow diagram for visualizing call summary, in accordance with some embodiments.

FIG. 16 is a more detailed example process flow diagram for visualizing call summary. In this sub-process, the system tabulates who spoke on the call, and the duration of each of these speakers (at 1602). A brief description of the call may be generated (at 1604) using this duration information.

The voice recording is then coupled to the summary (at 1606), and a determination may be made (at 1608) whether or not additional analytics are available or desired (at 1610). If analytics are not available, then the call summary is made available for sharing (at 1612) subject to the restrictions previously mentioned.

Figure 17:
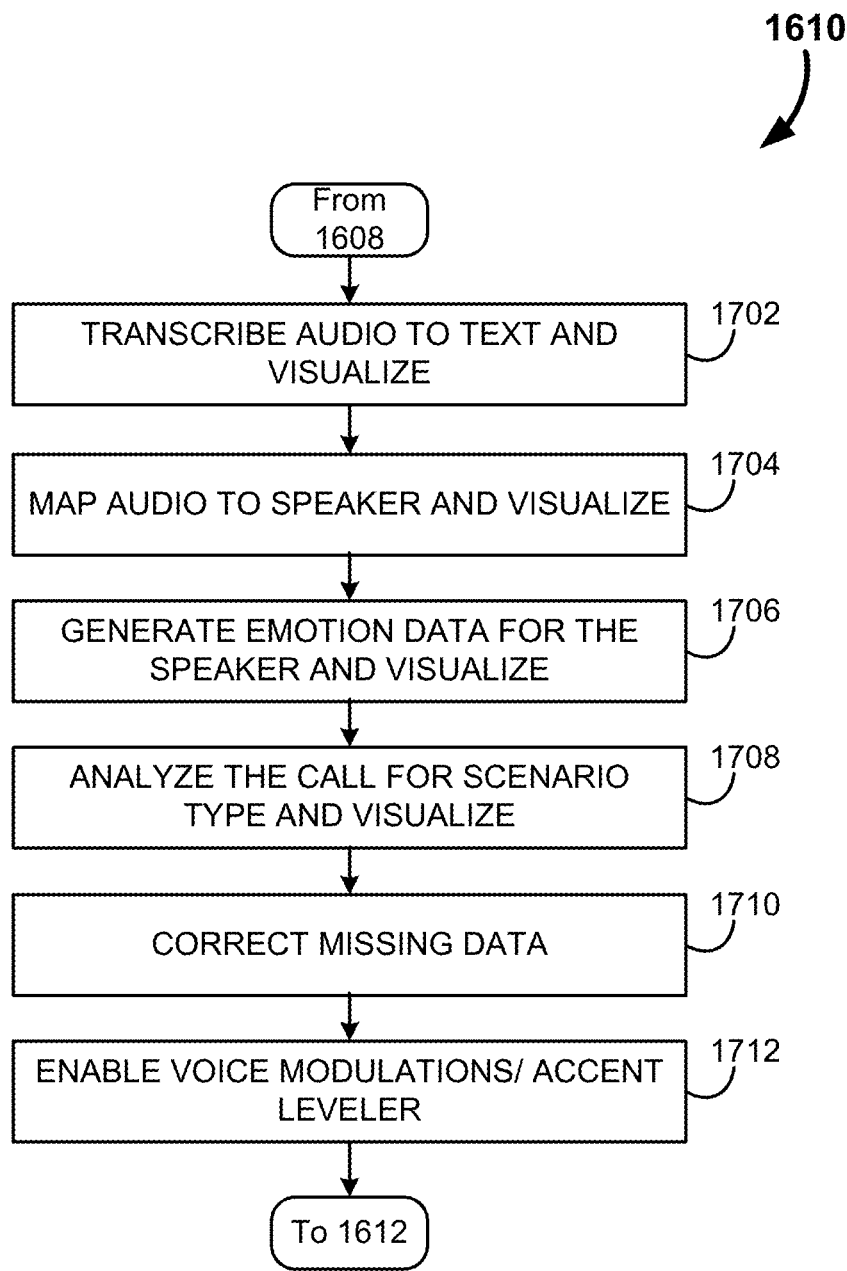
FIG. 17 is an example process flow diagram for visualization of call analytics, in accordance with some embodiments.

However, if additional analytics are in fact wanted, there may be an intervening process whereby the analytics are generated and appended to the summary (at 1610). FIG. 17 is an example process flow diagram for these analytics. The additional analytics may include transcription of the audio recording to text (at 1702), and visualization of the text in temporal relation to the audio visualization. The audio may be mapped to the speaker (at 1704) and likewise visualized. Emotional data may be generated using audio cues (at 1706), and these emotional states may be displayed in conjunction with the audio visualizations.

The call may be analyzed for the scenario and type (at 1708) and this may be incorporated into the call description. As noted before, who spoke and the duration of the respective speakers can be matched against known scenarios to determine what type of call it was (i.e., lecture, discussion, board meeting, etc.).

Missing or late data may likewise be repaired in the analysis (at 1710). A voice modulator may then make the audio portion of the recording more understandable by reducing background noises and leveling voice fluctuations and perceived accents (at 1712).

As previously noted, any of these analyses may be alternatively performed on the fly to provide these functionalities during the live call. This often depends heavily upon available processing bandwidth, and as such in some cases some of these analyses may be performed after the fact (such as voice accent modulation), whereas other processes (like emotion mapping) may be performed during the call.

II. Examples

Figure 18:
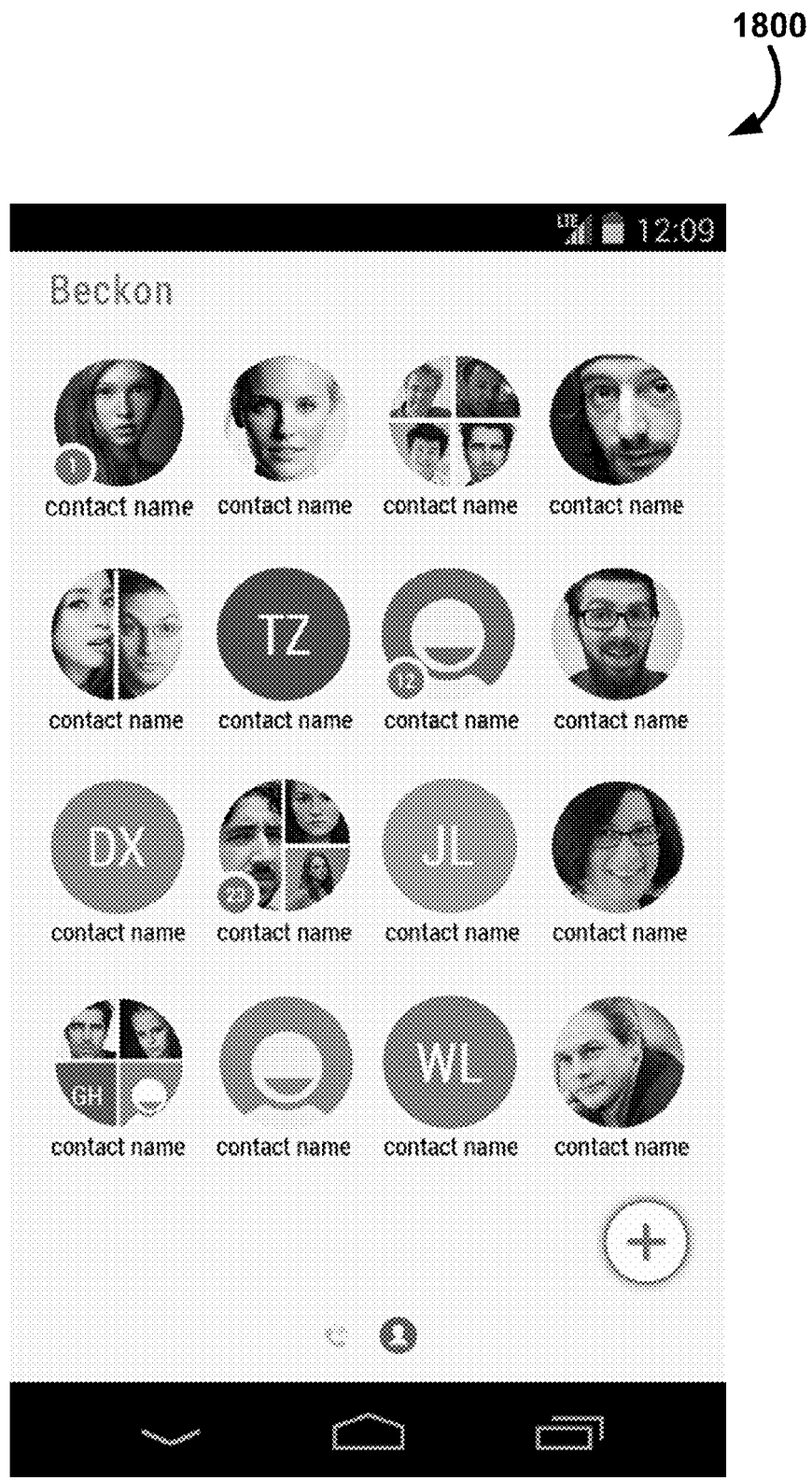
FIG. 18 is an example screenshot for a homepage for a call over network with visualization, in accordance with some embodiments.

Now that the systems and methods for improving call quality of calls over network have been described in considerable detail, a series of example screenshots are provided in reference to FIGS. 18-22 which exemplify the above systems and methods. For example, FIG. 18 provides an example screenshot for a homepage for a call over network with visualization, shown generally at 1800.

In this example screenshot, the contacts for the participant are displayed in a grid. The participant has the option of adding additional contacts (using the plus sign), or may choose to initiate a call. The instant example is clearly optimized for display on a smart phone or tablet display, including a touch screen. Of course these examples are merely intended to provide possible implementations of some of the disclosed systems and methods, and as such, the scope of this disclosure is intended to include interface layouts that are alternatively optimized for other display types, user preferences, etc.

Figure 19:
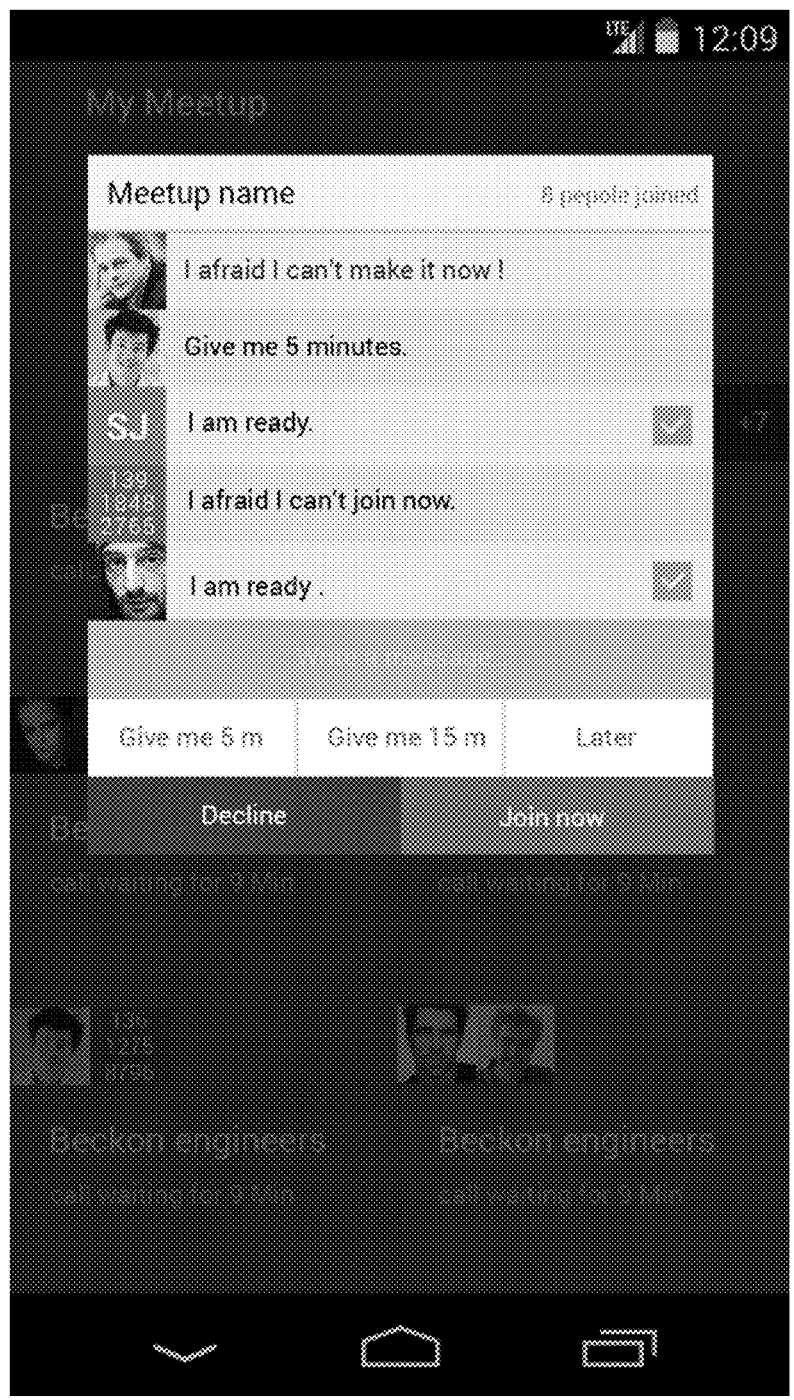
FIG. 19 is an example screenshot for the call scheduling, in accordance with some embodiments.

FIG. 19 is an example screenshot for the call scheduling, shown generally at 1900. In this example, a call request has been initiated, and the participant is capable of responding to the request. Other participants' indicators of readiness or inability to join are displayed. The participant has the option of writing a message to be displayed, or selecting one of any number of pre-written messages. Alternatively, the participant can indicate their readiness to join, or decline the call outright.

Figure 20:
FIGS. 20-21 are example screenshots for alternate means of displaying a call progressing with visualization, in accordance with some embodiments.
Figure 21:
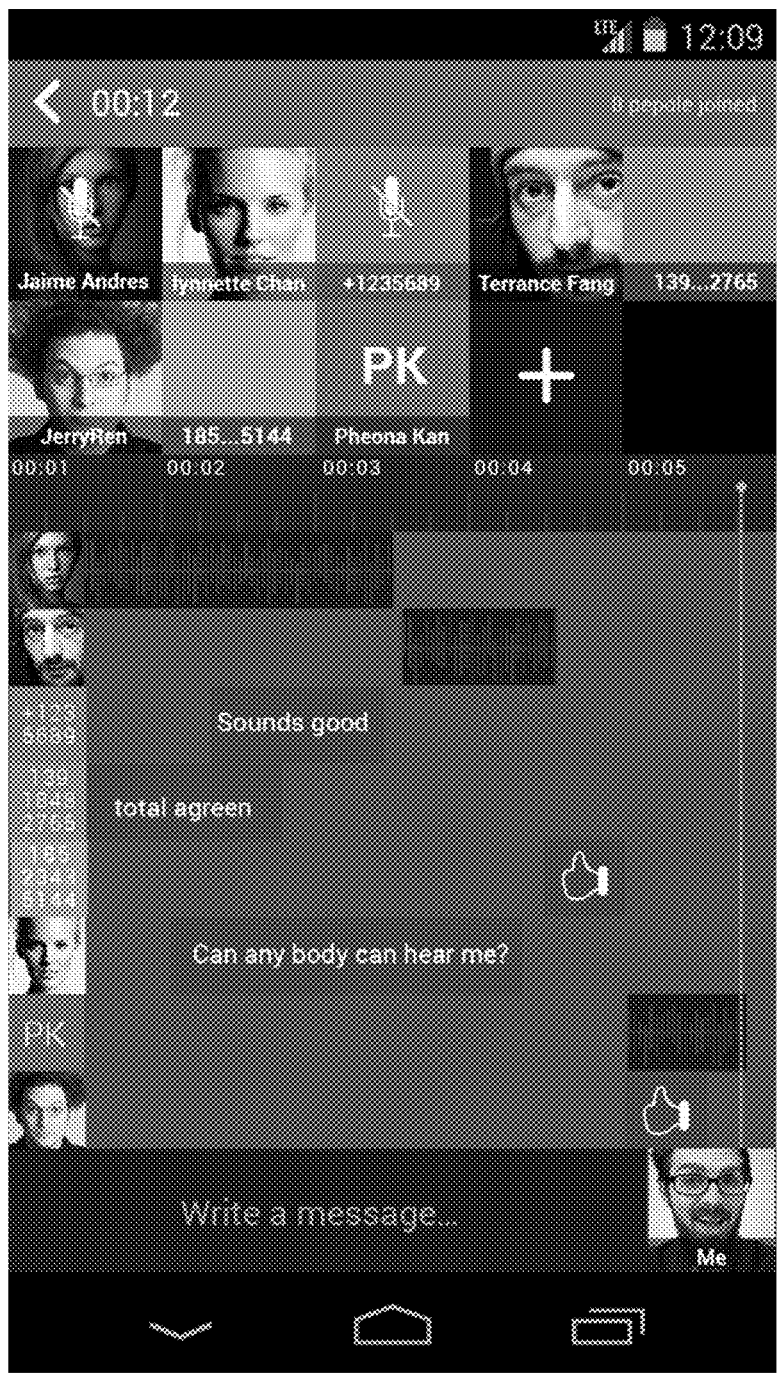

FIGS. 20-21 are example screenshots for alternate means of displaying a call progressing with visualization, in accordance with some embodiments. In FIG. 20, the call is visualized in a single channel, shown at 2000. Each participant is illustrated at the top of the display. Mute, or other features, are displayed for each participant accordingly as an overlay or coloration of the displayed contact. For example, a small hand is illustrated over two of the participants' icons. These "raised hands" indicate that these individuals wish to speak. Below the participant icons is illustrated a chronological timeline of all activity along a single channel. Participant features such as thumbs-up and thumbs down, volume level, and raising a hand are displayed on the right hand side of the interface. Lastly, a messaging box is provided at the bottom of this example display.

In contrast, FIG. 21 illustrates many of the same elements, but differs in that the call is visualized in multiple channels, shown generally at 2100. Rather than a timeline approach running vertically, in this example time scrolls from the left to the right. Each participant is shown as their own channel (labeled on the left hand side). As time progresses the participant actions or audio input is positioned in accordance with the timing. Thus, it can be seen that the first participant begins speaking at the beginning (represented by an audio waveform image). The third and fourth participants have provided texted input in relation to what is being said during this time. Next the second participant starts talking, which apparently the fifth participant agrees with (as indicated by the feedback thumbs-up symbol). The seventh participant has texted a question to the others asking if she can be heard.

Figure 22:
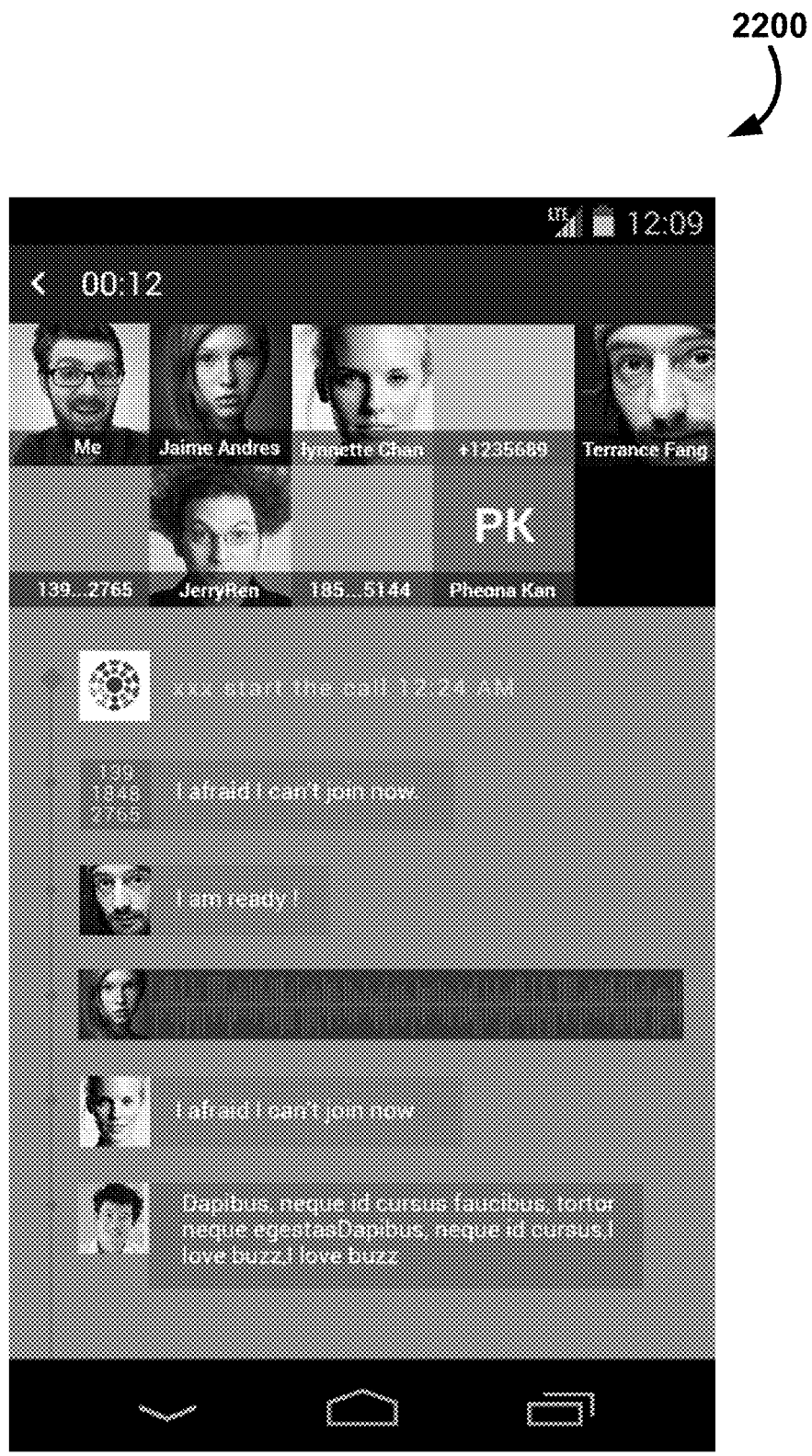
FIG. 22 is an example screenshot for a call summary with visualization, in accordance with some embodiments.

Moving on, FIG. 22 is an example screenshot for a call summary with visualization, shown generally at 2200. Here, all participant interactions and audio segments are compiled into a timeline summary. As noted, additional analysis may be performed on the call recording and likewise included into this summary. Although not illustrated, a participant may now upload or otherwise share the summary with others.

Clearly, such calls over a network are capable of conveying far more information between participants than traditional audio calls are able. This enables more efficient and effective calls over network.

Also clear is that not all functionalities disclosed above have been illustrated in the foregoing examples. This stems from the fact that some features (like a vibration ping, a pulsing color outline indicating participant emotional state, or audio playback indicating a delay in the audio) do not translate well to static figures. However, these figures are again intended to be merely examples, and such omissions are understood to in no way limit the scope of the present invention.

III. System Embodiments

Figure 23A:
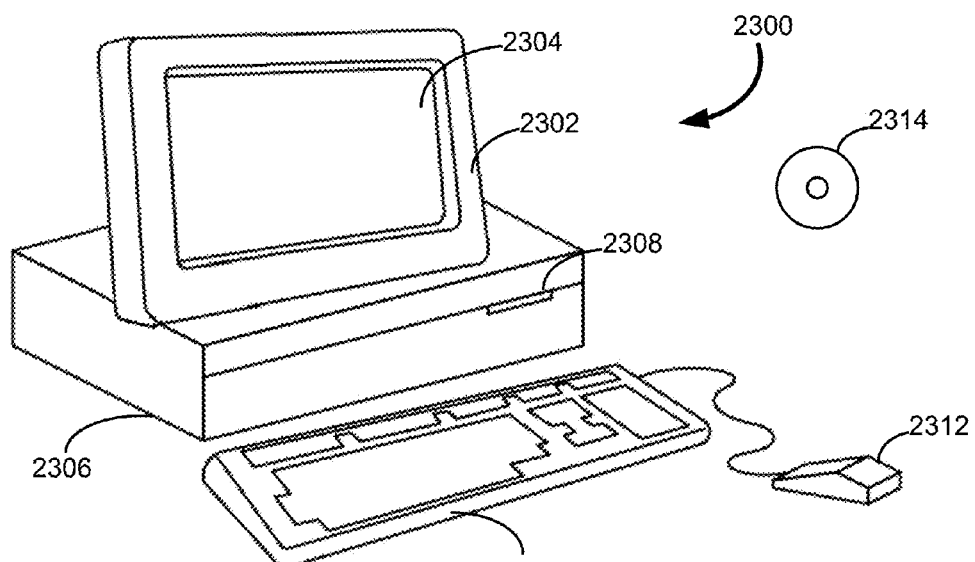
FIGS. 23A-23B are example computer systems capable of implementing the system for visualizing a call over network, in accordance with some embodiments.
Figure 23B:
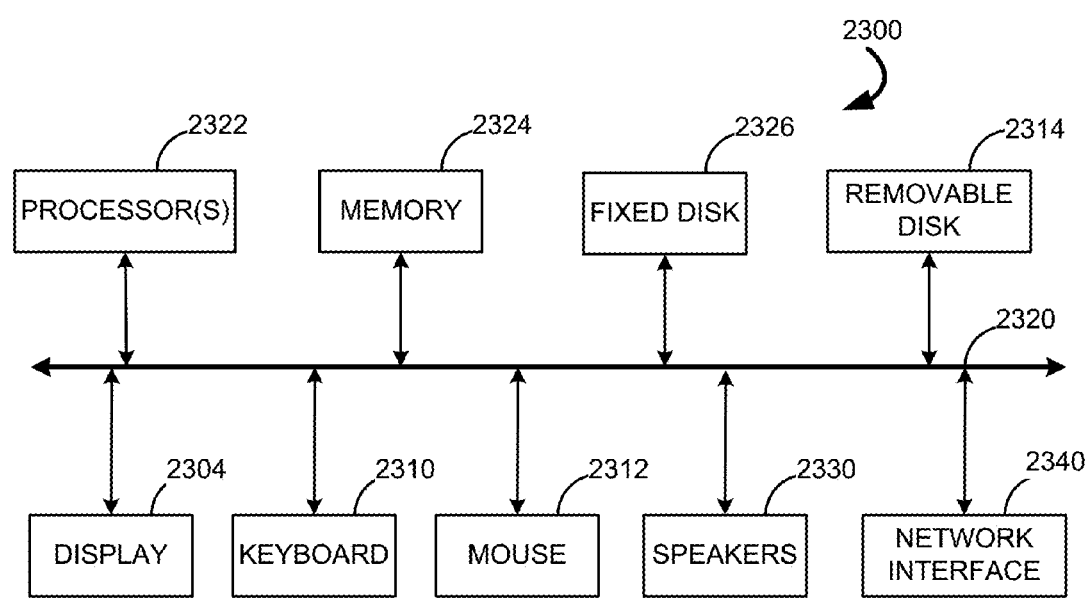

FIGS. 23A and 23B illustrate a Computer System 2300, which is suitable for implementing embodiments of the present invention, including server portions of the call over network. FIG. 23A shows one possible physical form of the Computer System 2300. Of course, the Computer System 2300 may have many physical forms ranging from a printed circuit board, an integrated circuit, and a small handheld device up to a huge super computer. Computer system 2300 may include a Monitor 2302, a Display 2304, a Housing 2306, a Disk Drive 2308, a Keyboard 2310, and a Mouse 2312. Disk 2314 is a computer-readable medium used to transfer data to and from Computer System 2300.

In addition to the standard desktop, or server, computer system illustrated, it is fully within the scope of this disclosure that any computer system capable of the required storage and processing demands would be suitable for embodying the present invention. This may include tablet devices, smart phones, pin pad devices, and any other computer devices, whether mobile or even distributed on a network (i.e., cloud based).

FIG. 23B is an example of a block diagram for Computer System 2300. Attached to System Bus 2320 are a wide variety of subsystems. Processor(s) 2322 (also referred to as central processing units, or CPUs) are coupled to storage devices, including Memory 2324. Memory 2324 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Disk 2326 may also be coupled bi-directionally to the Processor 2322; it provides additional data storage capacity and may also include any of the computer-readable media described below. Fixed Disk 2326 may be used to store programs, data, and the like and is typically a secondary storage medium (such as a hard disk) that is slower than primary storage. It will be appreciated that the information retained within Fixed Disk 2326 may, in appropriate cases, be incorporated in standard fashion as virtual memory in Memory 2324. Removable Disk 2314 may take the form of any of the computer-readable media described below.

Processor 2322 is also coupled to a variety of input/output devices, such as Display 2304, Keyboard 2310, Mouse 2312 and Speakers 2330. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. Processor 2322 optionally may be coupled to another computer or telecommunications network using Network Interface 2340. With such a Network Interface 2340, it is contemplated that the Processor 2322 might receive information from the network, or might output information to the network in the course of performing the above-described improvement in quality of a call over network. Furthermore, method embodiments of the present invention may execute solely upon Processor 2322 or may execute over a network such as the Internet in conjunction with a remote CPU that shares a portion of the processing.

In sum, the present disclosure provides systems and methods for improving the quality of a call over network. Such systems and methods enable clearer and more efficient communications which has distinct value for both businesses and casual users of such communication means.

While this invention has been described in terms of several embodiments, there are alterations, modifications, permutations, and substitute equivalents, which fall within the scope of this invention.

It should also be noted that there are many alternative ways of implementing the methods and systems of the present invention. It is therefore intended that the following appended claims be interpreted as including all such alterations, modifications, permutations, and substitute equivalents as fall within the true spirit and scope of the present invention.

What is claimed is:

1. In a computerized communication server, a method for improving quality of a Call-Over-Network ("CON") conference call, useful in association with a plurality of callers, each of the callers having a communicator, the method comprising:
   in a closed loop pathway tester of the communication server, testing at least two data pathways to generate feedback on pathway quality wherein the testing of the at least two data pathways comprises:
      sampling audio data with a microphone of a first communicator;
      transmitting the sampled audio data to a second communicator via at least two alternate data pathways;
      converting the transmitted audio data from each pathway via the speaker at the second communicator;
      collecting each of the converted audio data using a microphone of the second communicator; and
      comparing each collected audio data against the sampled audio data to determine pathway quality; and
   modulating a delay buffer length in response to the pathway quality.

2. The method of claim 1, wherein the audio data is generated as a test signal by a speaker on the first communicator.

3. The method of claim 1, further comprising selecting the pathway with the highest quality for the call over network.

4. The method of claim 3, wherein the delay buffer length is modulated according to the quality of the selected pathway.

5. The method of claim 4, further comprising determining a scenario for the call.

6. In a computerized communication server, a method for improving quality of a Call-Over-Network ("CON") conference call, useful in association with a plurality of callers, each of the callers having a communicator, the method comprising:
   in a closed loop pathway tester of the communication server, testing at least two data pathways to generate feedback on pathway quality, wherein the testing of the at least two data pathways comprises:
      generated a test signal by a speaker on a first communicator;
      collecting the test signal with a microphone of the first communicator;
      transmitting the collected test signal to a second communicator via at least two alternate data pathways; and
      comparing each transmitted test signal against the generated test signal to determine pathway quality; and
   modulating a delay buffer length in response to the pathway quality.

7. In a computerized communication server, a method for improving quality of a Call-Over-Network ("CON") conference call, useful in association with a plurality of callers, each of the callers having a communicator, the method comprising:

in a closed loop pathway tester of the communication server, testing at least two data pathways to generate feedback on pathway quality, wherein the testing of the at least two data pathways comprises transmitting a signal from a first communicator to a second communicator via at least two alternate data pathways and comparing each transmitted signal against the signal that originated at the first communicator to determine pathway quality; and modulating a delay buffer length in response to the pathway quality.

8. In a computerized communication server, a method for improving quality of a Call-Over-Network ("CON") conference call, useful in association with a plurality of callers, each of the callers having a communicator, the method comprising:

in a closed loop pathway tester of the communication server, testing at least two data pathways to generate feedback on pathway quality;

modulating a delay buffer length in response to the pathway quality;

selecting the pathway with the highest quality for the call over network, wherein the delay buffer length is modulated according to the quality of the selected pathway;

determining a scenario for the call, wherein the scenario is determined by comparing who speaks, and the duration of the speaking against known scenario types.

9. The method of claim 8, wherein the delay buffer length is modulated by considering the scenario, quality, and length of delay.

10. A system for improving quality of a Call-Over-Network ("CON") conference call, useful in association with a plurality of callers, each of the callers having a communicator, the system comprising:

a closed loop pathway tester configured to test at least two data pathways to generate feedback on pathway quality, wherein the closed loop pathway tester tests the at least two data pathways by:

sampling audio data with a microphone of a first communicator;

transmitting the sampled audio data to a second communicator via at least two alternate data pathways;

converting the transmitted audio data from each pathway via the speaker at the second communicator;

collecting each of the converted audio data using a microphone of the second communicator; and comparing each collected audio data against the sampled audio data to determine pathway quality; and a processor configured to modulate a delay buffer length in response to the pathway quality.

11. The system of claim 10, wherein the audio data is generated as a test signal by a speaker on the first communicator.

12. The system of claim 10, wherein the closed loop pathway tester tests the at least two data pathways by:

generated a test signal by a speaker on a first communicator;

collecting the test signal with a microphone of the first communicator;

transmitting the collected test signal to a second communicator via at least two alternate data pathways; and comparing each transmitted test signal against the generated test signal to determine pathway quality.

13. The system of claim 10, wherein the closed loop pathway tester tests the at least two data pathways by transmitting a signal from a first communicator to a second communicator via at least two alternate data pathways and comparing each transmitted signal against the signal that originated at the first communicator to determine pathway quality.

14. The system of claim 10, further comprising a pathway selector configured to select the pathway with the highest quality for the call over network.

15. The system of claim 14, wherein the processor modulates the delay buffer length according to the quality of the selected pathway.

16. The system of claim 15, further comprising a scenario analyzer configured to determine a scenario for the call.

17. The system of claim 16, wherein the scenario analyzer determines the scenario by comparing who speaks, and the duration of the speaking against known scenario types.

18. The system of claim 17, wherein the processor modulates delay buffer length by considering the scenario, quality, and length of delay.

* * * * *